(12) United States Patent
Sugawara et al.

(10) Patent No.: US 12,605,924 B2
(45) Date of Patent: Apr. 21, 2026

(54) ADHESIVE TRANSFER METHOD AND ADHESIVE TRANSFER DEVICE

(71) Applicant: CANON KABUSHIKI KAISHA, Tokyo (JP)

(72) Inventors: Takashi Sugawara, Kanagawa (JP); Masafumi Morisue, Tokyo (JP); Hiroshi Higuchi, Kanagawa (JP); Makoto Taguchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 18/528,943

(22) Filed: Dec. 5, 2023

(65) Prior Publication Data

US 2024/0190118 A1 Jun. 13, 2024

(30) Foreign Application Priority Data

Dec. 12, 2022 (JP) ................................. 2022-197712

(51) Int. Cl.
B32B 41/00 (2006.01)
B32B 37/00 (2006.01)

(52) U.S. Cl.
CPC ........ B32B 37/025 (2013.01); B32B 37/0046 (2013.01)

(58) Field of Classification Search
CPC .............. B32B 37/025; B32B 37/0046; H01L 21/67103; H01L 21/67132; H01L 21/68714; H01L 21/7806; H01L 21/68785; B05D 1/286
USPC ..................... 156/60, 64, 350, 351, 378, 379
See application file for complete search history.

(56) References Cited

U.S. PATENT DOCUMENTS

| | | | |
|---|---|---|---|
| 5,766,349 A | 6/1998 | Soyama et al. | |
| 5,928,722 A | 7/1999 | Soyama et al. | |

FOREIGN PATENT DOCUMENTS

| | | | | |
|---|---|---|---|---|
| JP | 8-309271 A | 11/1996 | | |
| KR | 20190060670 A | * | 6/2019 | ........... B65H 18/103 |

OTHER PUBLICATIONS

Morisue et al., U.S. Appl. No. 18/504,268, filed Nov. 8, 2024.

* cited by examiner

*Primary Examiner* — Michael N Orlando
*Assistant Examiner* — Joshel Rivera
(74) *Attorney, Agent, or Firm* — Venable LLP

(57) ABSTRACT

An adhesive transfer method for transferring an adhesive formed on a surface of a film onto an object, includes a pressurizing step of pressurizing the film from the back surface side thereof by a pressurizing member against the object; and a moving step of moving the pressurizing member from a first end toward a second end of the object in a given moving direction. In the moving step, the film is held, with a downstream part on the farther downstream side than a pressurized part that is pressurized by the pressurizing member in the moving direction being separated from the object, and with an upstream part on the farther upstream side than the pressurized part being separated from the object, and a part of the adhesive formed at the downstream part is released at the upstream part, so that a part of the adhesive is transferred onto the object.

16 Claims, 25 Drawing Sheets

ADHESIVE TRANSFER METHOD AND ADHESIVE TRANSFER DEVICE

BACKGROUND OF THE INVENTION

Field of the Invention

The present invention relates to an adhesive transfer method and an adhesive transfer device.

Description of the Related Art

In the current micromachining field, various structures having a plurality of substrates stacked therein are known. With such structures, the structure (shape) of the substrate is ingeniously innovatively formed so as to obtain desired functions. Each liquid discharge head mounted on various ink jet recording devices is a kind of the structure having a plurality of substrates stacked therein. With the liquid discharge head, the structure of the substrate is innovatively formed so as to obtain a function of discharging an ink. For example, the liquid discharge head has in the inside a piezoelectric element and a pressure chamber. By applying a voltage to the piezoelectric element, the piezoelectric element is deformed. The deformation of the piezoelectric element shrinks the pressure chamber. Then, the shrinkage of the pressure chamber causes ink in the pressure chamber to be discharged from the discharge port formed at one end of the pressure chamber. The structure such as a liquid discharge head is manufactured by bonding (joining) substrates by an adhesive.

As the method for applying such an adhesive for use in bonding the substrates, Japanese Patent Application Publication No. H8-309271 describes the method in which a film including an adhesive spread thereon is bonded onto the entire surface of a substrate, and then, the film is released from the entire surface of the substrate at a high speed, thereby transferring the adhesive from the film onto the substrate.

With the method of Japanese Patent Application Publication No. H8-309271, while dispensing the film from one end to the other end of the substrate at a low speed, an adhesive is bonded onto the substrate surface, and the film is bonded over the substrate entire surface; then, while tearing off the film from the other end to one end of the substrate at a high speed, the adhesive is partially left on the substrate surface. For this reason, a relatively longer time required for the film to reciprocate between one end and the other end of the substrate from the start of bonding of the film until the completion of releasing thereof is taken. This may cause an adverse effect due to the elongation of the time from the start of bonding of the film until the completion of releasing thereof. For example, the following case is assumed: by aggregation breaking transfer whereby the adhesive layer is broken in the inside, and is partially left on an object to be transferred by a low-viscosity adhesive, an adhesive 204 is transferred onto only the surface of a protruded portion 302 of a substrate 301 having unevenness in the surface as shown in FIG. 13. When a thermoplastic adhesive is used as the adhesive 204, for example, heating by a stage 102 for supporting the substrate 301 is performed. When the adhesive 204 continues to be heated for a long time from bonding to releasing, under the influence of the gravity, the adhesive 204 may run into the depressed portion. Thus, an adhesive film 501 may be extended in the depressed portion, or an adhesive 502 filling in the depressed portion may be generated.

SUMMARY OF THE INVENTION

The present invention shortens the time required for transfer of an adhesive in an adhesive transfer method and an adhesive transfer device for bonding a film, which includes an adhesive formed thereon, onto an object, and releasing the film from the object, thereby transferring the adhesive onto the object.

The present invention is an adhesive transfer method for transferring an adhesive formed on a surface of a film onto an object, the method comprising:

a pressurizing step of pressurizing the film from a back surface side thereof against the object by a pressurizing member; and a moving step of moving the pressurizing member from a first end toward a second end of the object in a given moving direction, wherein in a case where a portion of the film which is pressurized by the pressurizing member is referred to as a pressurized part, a portion of the film which is on a farther downstream side than the pressurized part in the moving direction is referred to as a downstream part, and a portion of the film which is on a farther upstream side than the pressurized part in the moving direction is referred to as an upstream part, in the moving step, the film is held, with the downstream part separated from the object and with the upstream part separated from the object, and a part of the adhesive formed at the downstream part is released at the upstream part, so that a part of the adhesive is transferred onto the object.

The present invention is an adhesive transfer device for transferring an adhesive formed on a surface of a film onto an object, the device comprising:

a frame to which a first end and a second end of the film are fixed;

a first frame support part for supporting a first fixing part of the frame to which the first end of the film is fixed;

a second frame support part for supporting a second fixing part of the frame to which the second end of the film is fixed;

a stage for setting the object such that the object is opposed to the surface of the film;

a pressurizing member capable of pressurizing the film from a back surface side thereof against the object; and a moving mechanism for moving the pressurizing member from a first end toward a second end of the object in a given moving direction while pressurizing the film against the object, wherein in a case where a portion of the film that is pressurized by the pressurizing member is referred to as a pressurized part, a portion of the film which is on a farther downstream side than the pressurized part in the moving direction is referred to as a downstream part, a portion of the film which is on a farther upstream side than the pressurized part in the moving direction is referred to as an upstream part, a height, at which the first frame support part supports the first fixing part, is referred to as a first support height, and a height, at which the second frame support part supports the second fixing part, is referred to as a second support height, the first support height and the second support height are set such that, when the pressurizing member moves while pressurizing the film against the object, the film is held, with the downstream part being separated from the object and with the upstream part being separated from the object.

Further features of the present invention will become apparent from the following description of exemplary embodiments with reference to the attached drawings.

DESCRIPTION OF THE EMBODIMENTS

Below, referring to the accompanying drawings, a description will be given to embodiments of an adhesive transfer device and an adhesive transfer method of the present invention. Incidentally, the following description exemplarily describes the embodiments of the present invention. The scope of the present invention is not limited to the contents described below. The dimensions, shapes, the positional relationships, directions, materials, and the like in the following description can be appropriately changed within the scope of the present invention.

Embodiment 1

Figure 1:
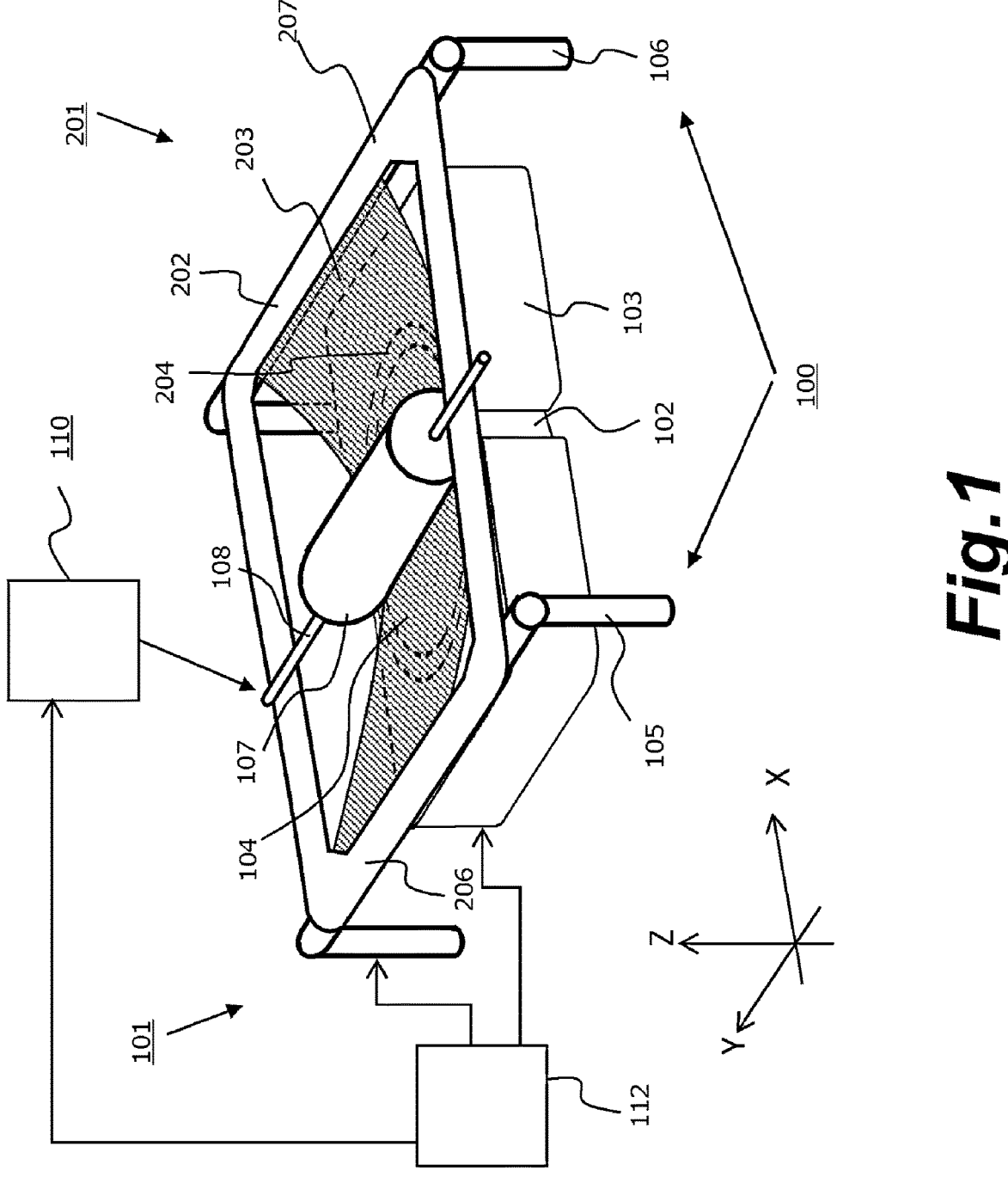
FIG. 1 is a perspective view showing an adhesive transfer device of Embodiment 1.
Figure 2:
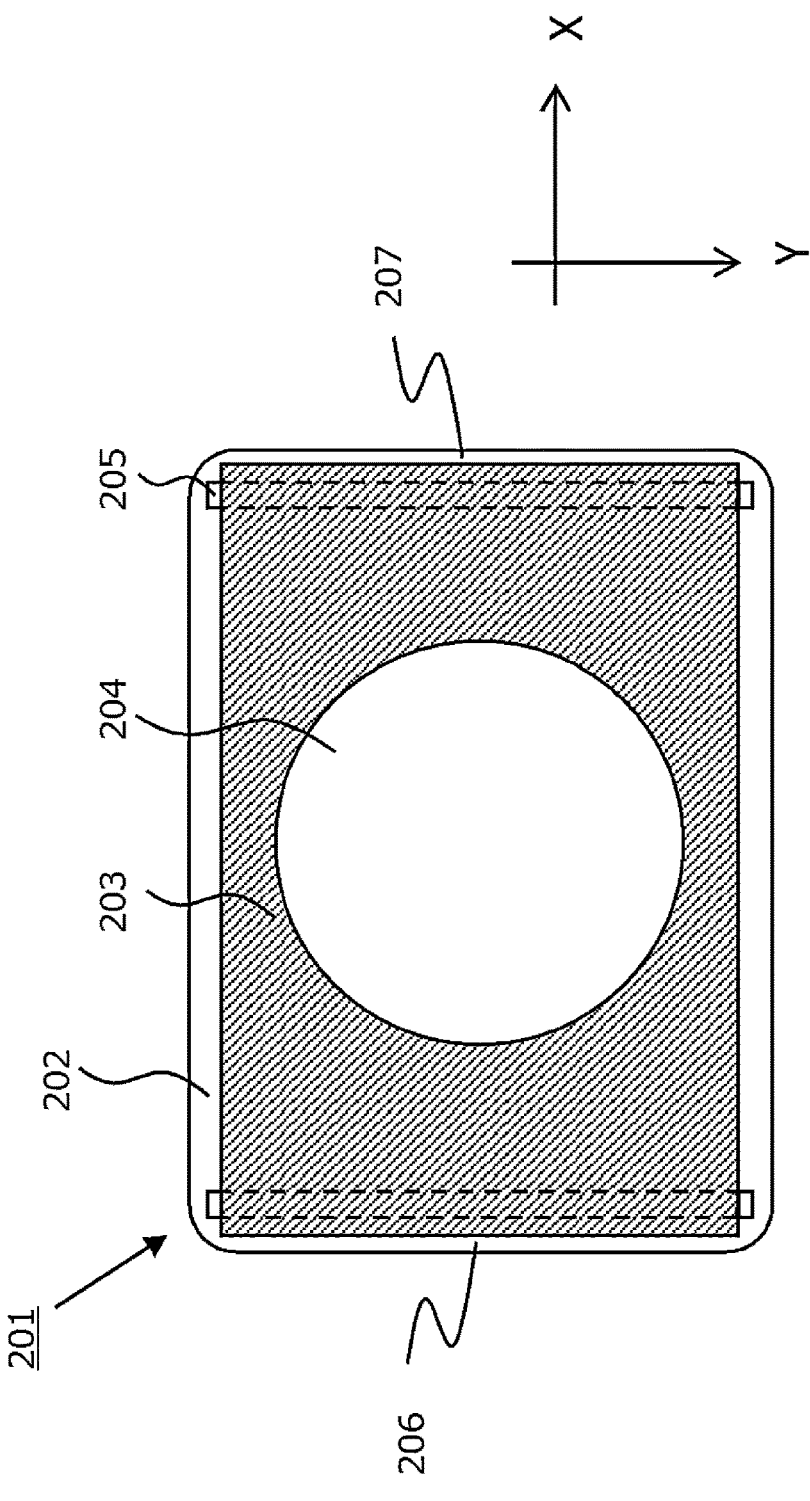
FIG. 2 is a plan view of a frame jig of Embodiment 1.
Figure 3A:
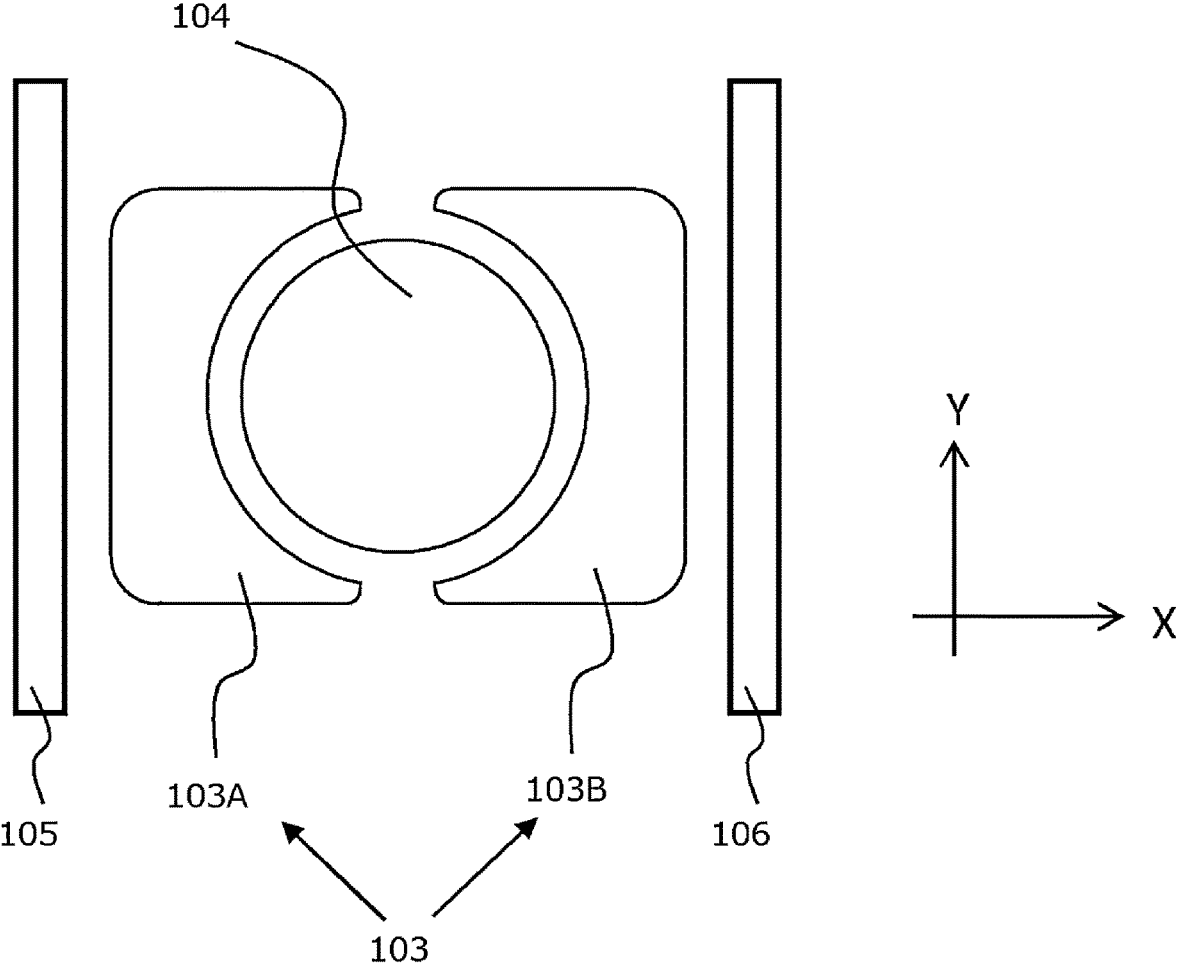
FIG. 3A is a plan view showing the adhesive transfer device of Embodiment 1.
Figure 3B:
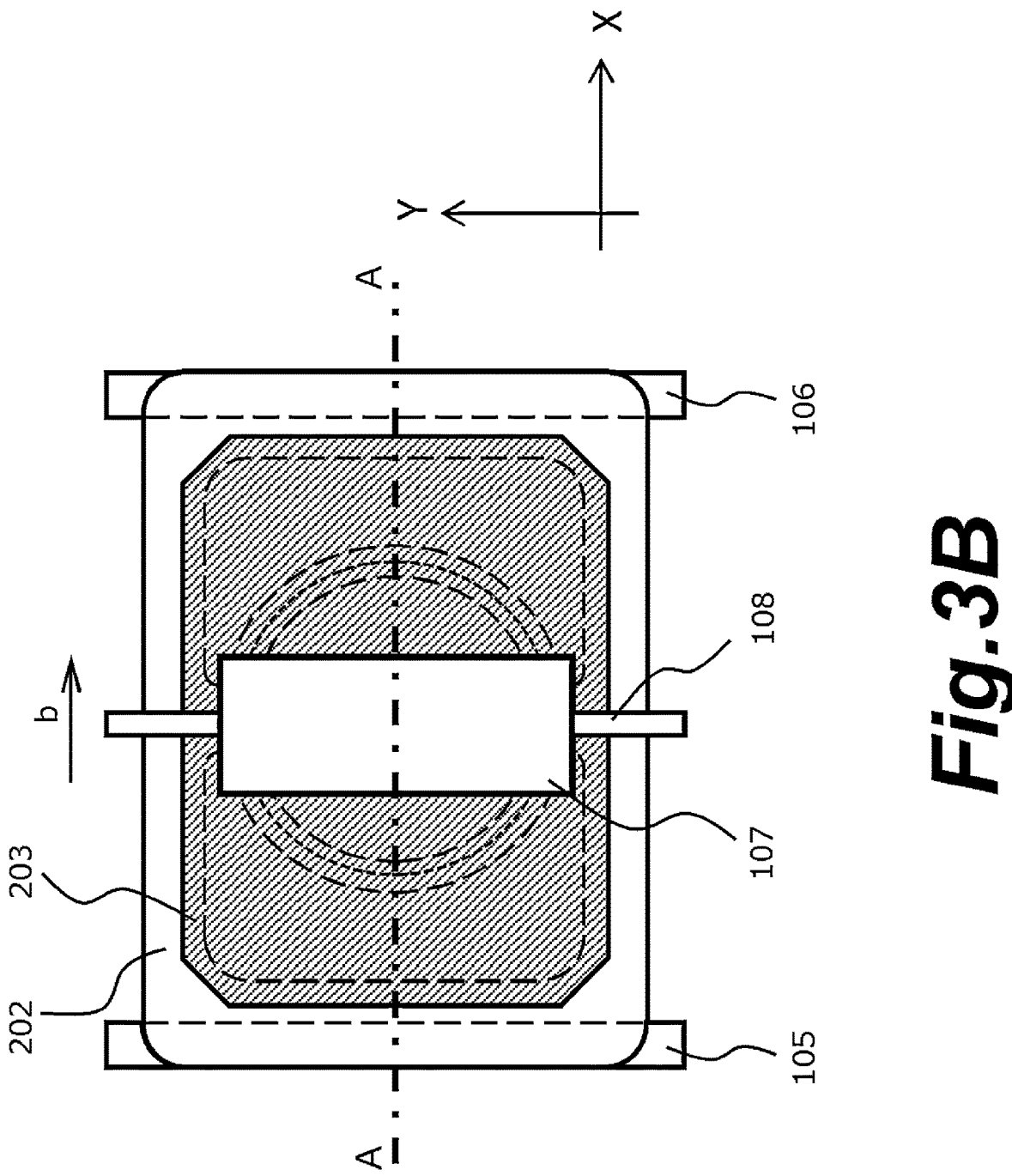
FIG. 3B is a plan view showing the adhesive transfer device of Embodiment 1.
Figure 3C:
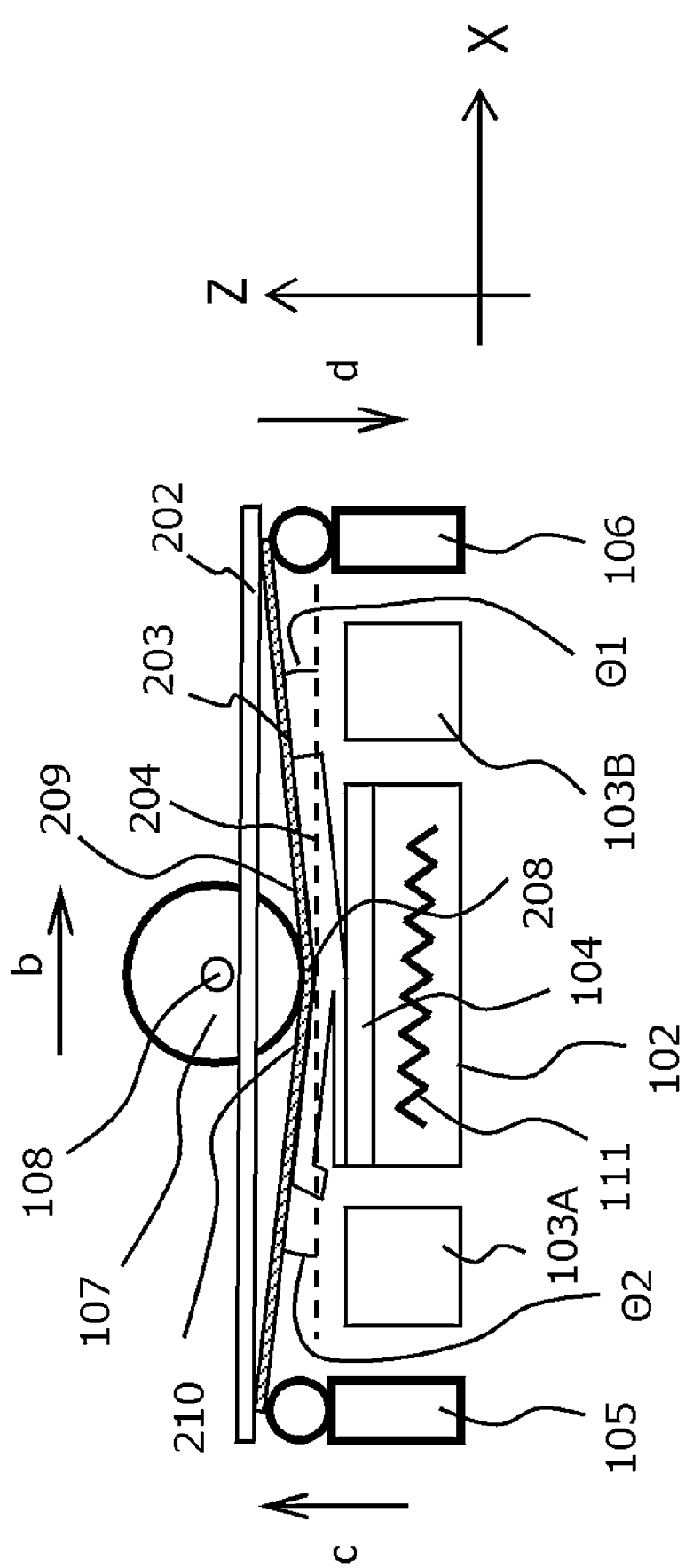
FIG. 3C is a cross sectional view showing the adhesive transfer device of Embodiment 1.

FIG. 1 is a perspective view showing an adhesive transfer device 101 of Embodiment 1. FIG. 2 is a plan view of a frame jig 201 of Embodiment 1 taken in a vertical upward direction. FIG. 3A and FIG. 3B are each a plane view of the adhesive transfer device 101 taken in a vertical downward direction. In FIG. 3A, for simplification, a pressure roller 107, a roller shaft 108, a frame 202, and a film 203 are not shown. FIG. 3C is a cross sectional view shown along line AA in FIG. 3B. In the following description, the direction from a first side 206 toward a second side 207 of the frame 202 is assumed to be an X direction, the direction of extension of the first side 206 and the second side 207 is assumed as a Y direction, and the direction perpendicular to the first side 206 and the second side 207 (the vertical direction in Embodiment 1) is assumed as a Z direction. In Embodiment 1, the direction crossing the surface of an object 104 is the Z direction, and the directions along the surface of the object 104 are the X direction and the Y direction (the directions along the XY plane).

The adhesive transfer device 101 has the frame jig 201, a frame support device 100, the pressure roller 107, a stage 102 for supporting the object 104 onto which an adhesive 204 is transferred, an auxiliary stage 103 for dispersing the pressure by the pressure roller 107, and a control part 112.

The frame jig 201 has a film 203 including an adhesive 204 formed on the surface (lower surface) thereof, a frame-shaped frame 202 onto which one end (first end) and the other end (second end) of the film 203 are fixed, and a fixing part 205 for fixing the film 203 onto the frame 202. The frame 202 is rectangular, and a pair of sides facing each other in the X direction of the four sides are assumed as the first side 206 and the second side 207. The fixing parts 205 are provided along the first side 206 and the second side 207, respectively. The first side 206 onto which one end of the film 203 is fixed by the fixing part 205 is a first fixing part of the frame 202. The second side 207 onto which the other end of the film 203 is fixed by the fixing part 205 is a second fixing part of the frame 202.

The frame support device 100 has a first frame support part 105 and a second frame support part 106 for supporting the opposing first side 206 and second side 207 of the frame 202, respectively, and supports the frame jig 201.

The first frame support part 105 supports the frame jig 201 at a higher position than that of the object 104 at the position on the farther upstream side in the scanning direction b (the moving direction. the +X direction) of the pressure roller 107 than one end of the object 104 (the first end. the end on the first frame support part 105 side. the end in the −X direction). Further, the second frame support part 106 supports the frame jig 201 at a higher position than that of the object 104 at the position on the farther downstream side in the scanning direction b (the +X direction) of the pressure roller 107 than the other end of the object 104 (the second end. the end on the second frame support part 106 side. the end in the +X direction).

As a result of this, the film 203 is held with a downstream part 209 on the farther downstream side and an upstream part 210 on the farther upstream side in the scanning direction b than a pressurized part 208 pressurized by the pressure roller 107 separated from the object 104. The film 203 is supported at a higher position than that of the surface of the object 104 on the farther downstream side in the scanning direction b than the other end of the object 104. The downstream side angle θ1 formed between the downstream part 209 of the film 203 and the surface of the object 104 is larger than 0°. Further, the film 203 is supported at a higher position than that of the surface of the object 104 at the position on the farther upstream side than one end of the object 104 in the scanning direction b. The upstream side angle θ2 formed between the upstream part 210 of the film 203 and the surface of the object 104 is larger than 0°.

The pressure roller 107 is a pressurizing member capable of pressurizing the film 203 against the object 104 from the back surface side (the upper surface side). The pressure roller 107 has a roller shaft 108, and the roller shaft 108 is rotatably supported by a roller support device 110. Further, the roller support device 110 is a moving mechanism capable of moving the pressure roller 107 in the direction crossing the surface of the object 104, and the direction along the surface of the object 104. In Embodiment 1, the roller support device 110 moves up the pressure roller 107 in the Z direction (vertical direction) and moves the pressure roller 107 from one end toward the other end of the object 104 in a given movement direction (the +X direction. the scanning direction indicated with an arrow b) while pressurizing the film 203 against the object 104. The roller support device 110 supports and moves the pressure roller 107 in such a manner that the film 203 is pressurized against the object 104 from the back surface (the surface opposite to the surface including the adhesive 204 formed thereon) side by the pressure roller 107. Incidentally, although the particular structure of the roller support device 110 is not shown for avoiding the complication of the drawing, known support mechanism and driving mechanism can be appropriately adopted.

A stage 102 has an adsorbing member for adsorbing the object 104, can set the object 104 so that the object 104 is opposed to the surface of the film 203, and supports the object 104 so as to prevent the object 104 from being shifted in the transfer step. Further, the stage 102 has a heater 111 of a heating member for heating the adhesive 204 and can heat the adhesive 204 via the object 104 set on the stage 102. In Embodiment 1, the object 104 is circular, and the stage 102 for supporting this is a cylindrical member having a circular setting surface with a larger area than that of the object 104.

The auxiliary stage 103 is arranged between the stage 102 and the first frame support part 105, and between the stage 102 and the second frame support part 106. The auxiliary stage 103 has a first portion 103A arranged so as to be opposed to the outer circumferential surface on the –X direction side of the cylindrical stage 102, and a second portion 103B arranged so as to be opposed to the outer circumferential surface on the +X direction side of the stage 102. The auxiliary stage 103 forms a shape close to a rectangle as the entirety in a plan view (shape in a XY plane). As a result of this, when the pressure roller 107 with the roller shaft 108 extending in the Y direction scans the object 104 circular in a plan view in the X direction while pressurizing the object 104 via the film 203, variations in the pressurizing force according to the pressurization position in the X direction are suppressed. Further, the pressure roller 107 can roll on the first portion 103A of the auxiliary stage 103, so that the pressure roller 107 can start to move from the position on the farther upstream side in the scanning direction b than the end on the first frame support part 105 side of the object 104. Further, the pressure roller 107 can roll on the second portion 103B of the auxiliary stage 103. For this reason, the pressure roller 107 can move to the position on the farther downstream side in the scanning direction b than the end on the second frame support part 106 side of the object 104. In other words, the auxiliary stage 103 is usable as the place for letting the pressure roller 107 go at the time of start of transfer and at the time of end of transfer. As a result of this, also at the end of the object 104 (each position of transfer start and transfer end), the bonding step and the releasing step can be performed under the same conditions as those at other positions (e.g., the central part in the scanning direction b).

At least any of the stage 102 and the auxiliary stage 103 may have a mechanism capable of adjusting the height of the surface so that the height of the objective adhesive transfer surface of the object 104 set at the stage 102 and the height of the upper surface of the auxiliary stage 103 may become the same. As a result of this, it is possible to reduce the variations in pressure caused to act on the film 203, the adhesive 204, and the object 104 by the pressure roller 107 according to the position (transfer position) in the X direction.

The control part 112 is a computer for controlling the operation of the adhesive transfer device 101. The control part 112 controls the operations of the roller support device 110 and the heater 111 of the stage 102. Further, in Embodiment 1 in which the frame support device 100 has a driving device such as a motor, the control part 112 controls the operation of the frame support device 100.

As the materials forming the frame 202, there can be used, for example, materials made of a metal such as a stainless steel, or made of glass, and a resin having a chemical resistance (e.g., a fluorocarbon resin, chlorinated polyether, or furan).

Examples of the constituent materials for the film 203 may include polyethylene terephthalate, a tetrafluoroethylene·perfluoroalkyl vinyl ether copolymer (PFA), a tetrafluoroethylene·hexafluoropropylene copolymer (FEP), polychlorotrifluoroethylene (PCTFE), a cycloolefin polymer (COP), and tetrafluoroethylene·ethylene copolymer (ETFE).

As the adhesive 204, a thermoplastic material which is softened by heating, and is solidified by cooling is preferable. For example, epoxy, acrylic, urethane, silicon, benzocyclobutene, polyimide, polyamide, polyamideimide, cyano acrylate, phenol, melamine, styrene, cyclized rubber, or a mixture thereof can be used.

As the object 104, for example, a silicon substrate can be exemplified.

Transfer Step

Referring to FIGS. 4A to 4D and 5, the adhesive transfer method of Embodiment 1 will be described. FIGS. 4A to 4D, and 5 are each a cross sectional view of a part of the adhesive transfer device 101 for illustrating the adhesive transfer method at the same position as line AA of FIG. 3B.

Figure 4A:
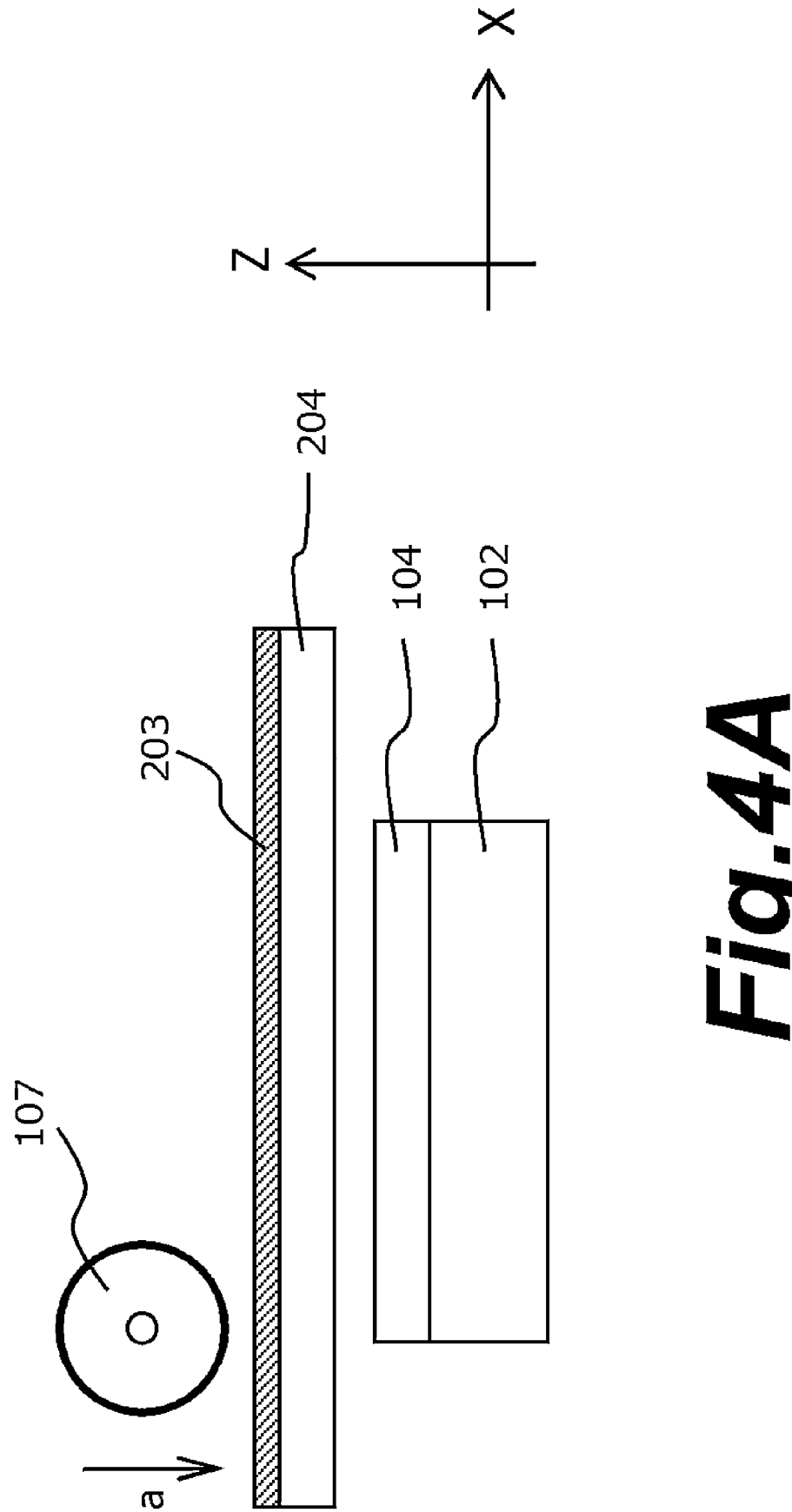
FIG. 4A is a cross sectional view showing an adhesive transfer method of Embodiment 1.

First, as shown in FIG. 4A, the object 104 is set on the stage 102, the film 203 including the adhesive 204 formed on the surface thereof is fixed at the frame 202, and the frame jig 201 is set at the frame support device 100. The roller support device 110 moves down the pressure roller 107 vertically downward (in the −Z direction. indicated with an arrow a) from the back surface side of the film 203 toward the object 104.

Figure 4B:
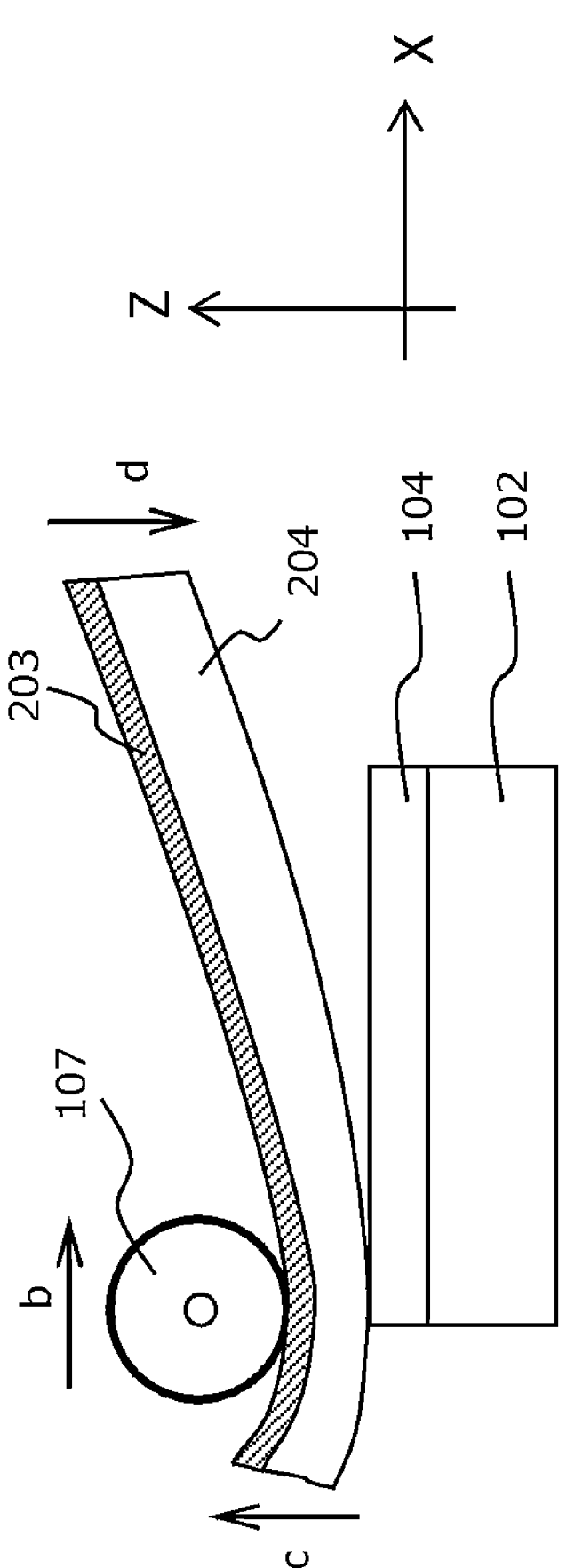
FIG. 4B is a cross sectional view showing the adhesive transfer method of Embodiment 1.

Then, as shown in FIG. 4B, there is performed a pressurizing step of controlling the roller support device 110 in such a manner as to pressurize the film 203 from the back surface side against the object 104 by the pressure roller 107. Herein, support and movement by the roller support device 110 are performed so that the pressure roller 107 pressurizes the film 203 with such a pressure as to cause the adhesive 204 formed on the surface of the film 203 to come in contact with and come in close contact with the surface of the object 104. As a result of this, the adhesive 204 is bonded onto the surface of the object 104.

Figure 4C:
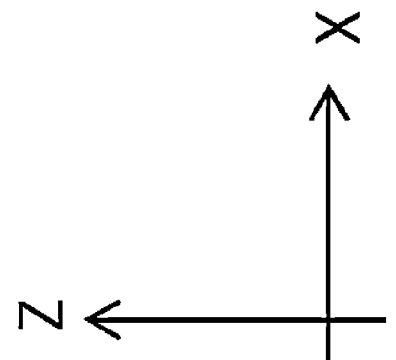
FIG. 4C is a cross sectional view showing an adhesive transfer method of Embodiment 1.
Figure 4C:
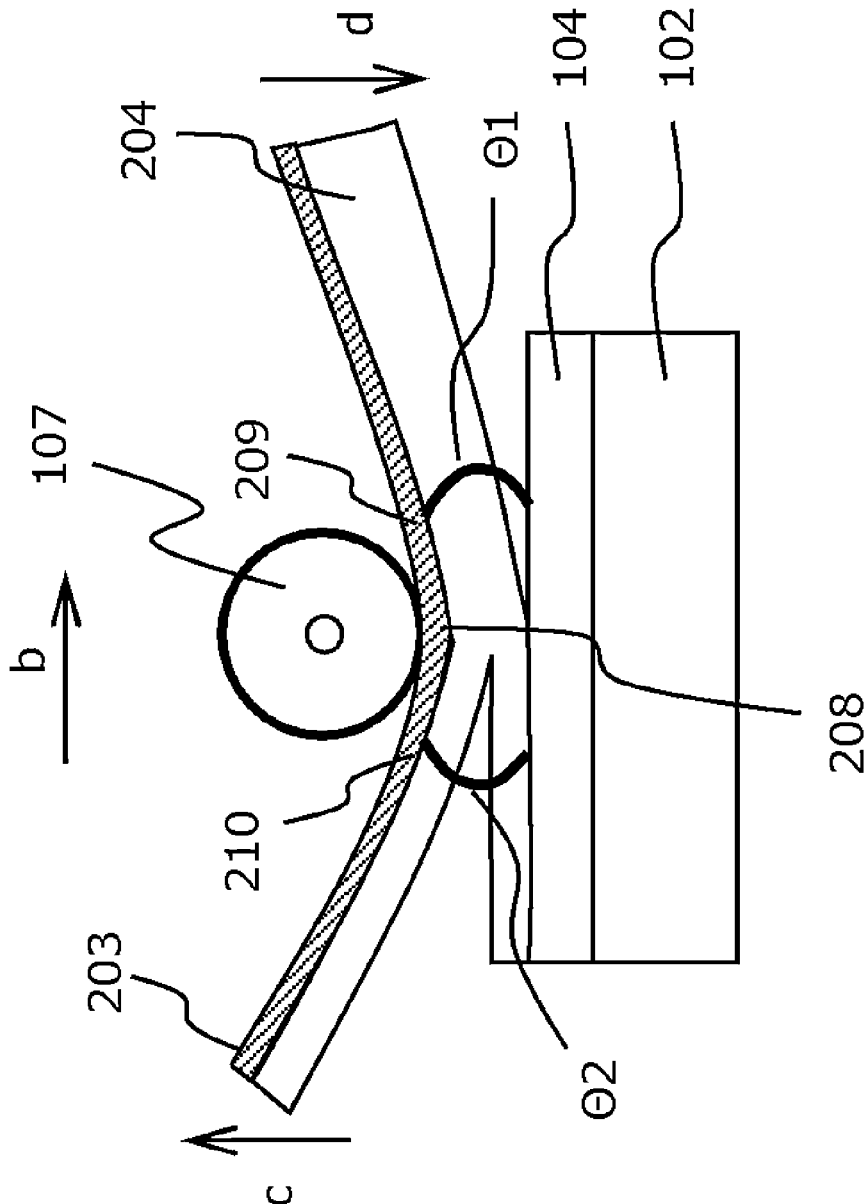

Then, as shown in FIG. 4C, a moving step of moving the pressure roller 107 from one end toward the other end of the object 104 in a given moving direction (the scanning direction. the +X direction. indicated with an arrow b) is performed. In Embodiment 1, one end of the object 104 is the end in the −X direction (on the first frame support part 105 side), and the upstream side end in the scanning direction b. The other end of the object 104 is the end in the +X direction (on the second frame support part 106 side), and the downstream side end in the scanning direction b.

As described above, the film 203 is held with the downstream part 209 on the farther downstream side and the upstream part 210 on the farther upstream side in the scanning direction b than the pressurized part 208 pressurized by the pressure roller 107 separated from the object 104. Then, the downstream side angle θ1 formed between the downstream part 209 of the film 203 and the surface of the object 104 is larger than 0°, and the upstream side angle θ2 formed between the upstream part 210 of the film 203 and the surface of the object 104 is larger than 0°.

The V shape in which the downstream part 209 and the upstream part 210 separated from the object 104 are present on both sides in the scanning direction b across the pressurized part 208 of the film 203 moves in the scanning direction b in accordance with the movement of the pressure roller 107. Therefore, when attention is paid on a certain point of the film 203, as the pressure roller 107 approaches from the farther upstream side than the point, the point moves down from the position separated from the object 104 in the −Z direction (vertically downward. indicated with an arrow d) and approaches the object 104. Then, when the pressure roller 107 reaches the point, the point is pressurized by the pressure roller 107, and becomes the pressurized part 208. As the pressure roller 107 passes through the point, and moves away to the downstream side, the point moves up in the +Z direction (vertically upward, indicated with an arrow c), and moves away from the object 104.

In this manner, the adhesive 204 formed at the downstream part 209 comes in close contact with the object 104 at the pressurized part 208, and a part of the adhesive 204 is released from the film 203 at the upstream part 210, and is left on the surface of the object 104. As a result of this, in the moving step, in conjunction with the movement of the pressure roller 107 in the scanning direction b while pressurizing the film 203, a part of the adhesive 204 formed on the surface of the film 203 is transferred onto the object 104.

Figure 4D:
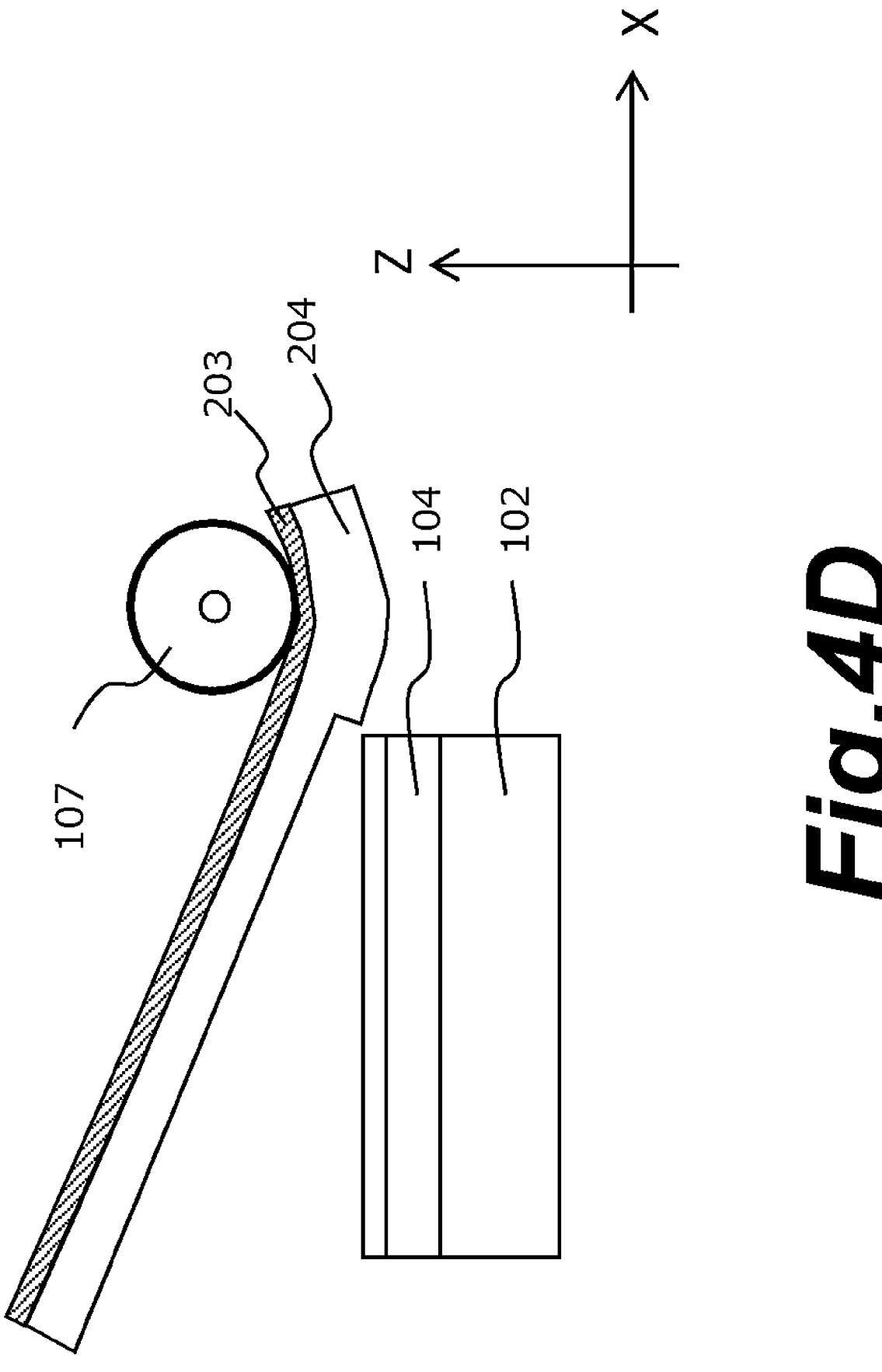
FIG. 4D is a cross sectional view showing the adhesive transfer method of Embodiment 1.

Then, as shown in FIG. 4D, the movement of the pressure roller 107 to the other end of the object 104 results in the completion of transfer of the adhesive 204 onto the entire surface of the object 104.

Thus, with the adhesive transfer method of Embodiment 1, the film 203 on the farther upstream side and the farther downstream side than the pressurized part 208 by the pressure roller 107 in the scanning direction b is raised. Then, the bonding step of the adhesive 204 is performed at the pressurized part 208, and the releasing step is performed on the upstream side of the pressurized part 208. In other words, the bonding step and the releasing step of the adhesive 204 are performed at the same time in the vicinity of the pressure roller 107 moving in the scanning direction b. For this reason, with one scanning in one direction (the scanning direction b) of the pressure roller 107 from one end (the upstream side end) to the other end (the downstream side end) of the object 104, transfer of the adhesive 204 onto the entire surface of the object 104 is completed. Therefore, it becomes possible to shorten the time required for transfer of the adhesive as compared with the case where the bonding step is performed by outward first scanning, and the releasing step is performed by return second scanning.

Transfer onto Uneven Surface

Figure 5:
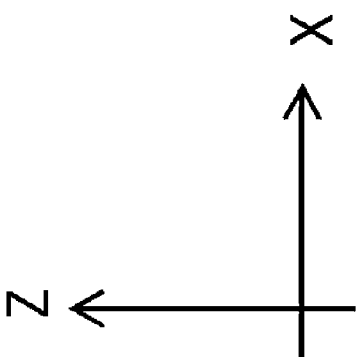
FIG. 5 is a cross sectional view showing the adhesive transfer method of Embodiment 1.
Figure 5:
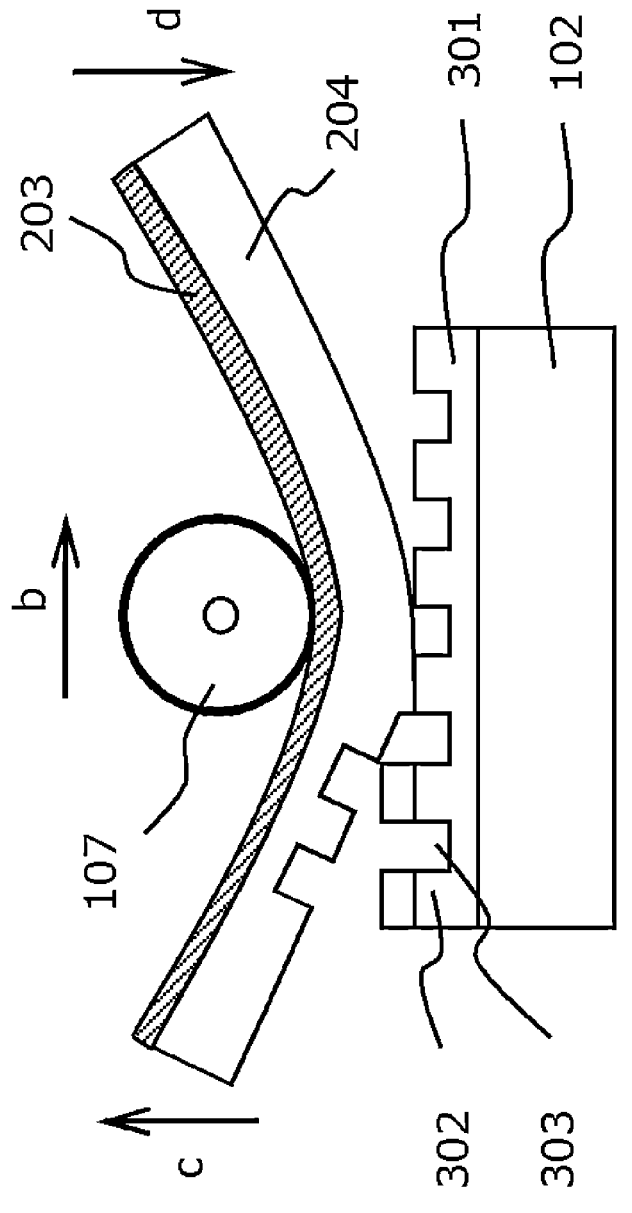

With the adhesive transfer method of Embodiment 1, the adhesive 204 comes in contact with the surface of the object 104, thereby to be transferred thereon. For this reason, as shown in FIG. 5, when a substrate 301 having an uneven structure according to the function on the surface is an object, the adhesive 204 which has come in contact with the surface of a protruded portion 302 is transferred onto the substrate 301. The adhesive 204 at the position of a depressed portion 303 not coming in contact with the substrate 301 is not transferred. With the adhesive transfer method of Embodiment 1, the time between the bonding step and the releasing step is short. For this reason, it is possible to prevent the phenomenon in which the adhesive 204 not transferred between the bonding step and the releasing step from running down to the depressed portion 303. Further, when a thermoplastic material is used as the adhesive 204, and heating by a heater 111 is performed at the transfer step of the adhesive 204, the time between the bonding step and the releasing step is short. For this reason, the adhesive 204 is released before thermal expansion. For this reason, it is possible to suppress inferior transfer such as filling in of the depressed portion 303 which has become a closed space by the bonding step with the thermally expanded adhesive 204.

Modified Example

With the adhesive transfer method of Embodiment 1 described up to this point, the downstream side angle θ1 formed between the downstream part 209 of the film 203 and the surface of the object 104, and the upstream side angle θ2 formed between the upstream part 210 of the film 203 and the surface of the object 104 may be set at a smaller angle than 70°. As a result of this, it is possible to suppress floating of the pressure roller 107, and release of the film 203 from the frame 202. Incidentally, for the countermeasure against release of the film 203 from the frame 202, another example will be described later with reference to FIG. 8.

Further, during scanning (the moving step) of the pressure roller 107, the downstream side angle θ1 formed between the downstream part 209 of the film 203 and the surface of the object 104, and the upstream side angle θ2 formed between the upstream part 210 of the film 203 and the surface of the object 104 may be set constant. By setting the downstream side angle θ1 and the upstream side angle θ2 constant, the force in the +Z direction (indicated with an arrow c) exerted by the film 203 on the pressure roller 107 becomes constant. As a result of this, the force of the film 203 to raise the pressure roller 107 becomes constant. For this reason, the state of the adhesive 204 can be stabilized over the entire surface of the object 104. Further, the upstream side angle θ2 is the angle affecting release of the adhesive 204. The upstream side angle θ2 being constant can stabilize the state of the adhesive 204 over the entire surface of the object 104.

Further, during scanning (the moving step) of the pressure roller 107, the viscosity of the adhesive 204 for releasing the film 203 from the object 104 may be set at 237 Pa·s or less. As the method for making the viscosity of the adhesive 204 at about 237 Pa·s or less, the following method can be exemplified. Namely, mention may be made of a method having a heating step of heating the adhesive 204 in contact with the object 104 via the object 104 by heating of the heater 111 of the stage 102 using a thermoplastic adhesive 204. As a result of this, it is possible to preferably perform aggregation breaking transfer in which the adhesive 204 layer is broken in the inside thereof at the releasing step, and is partially left on the object 104, thereby performing transfer.

Embodiment 2

Auxiliary Roller

Figure 6A:
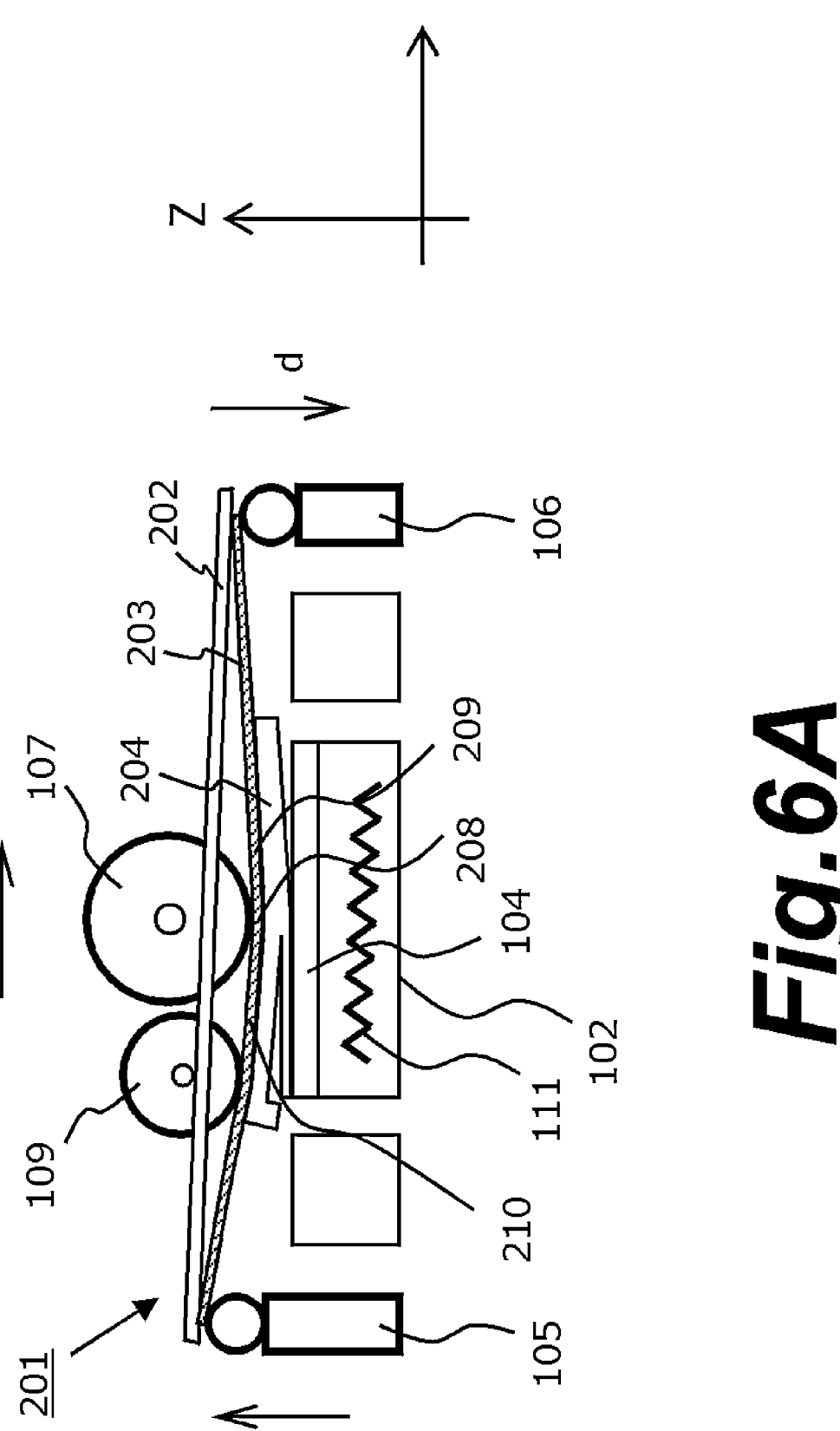
FIG. 6A is a cross sectional view showing an adhesive transfer device of Embodiment 2.

FIG. 6A is a cross sectional view of an adhesive transfer device 101 of Embodiment 2 at the same position as line AA of FIG. 3B. In Embodiment 2, an auxiliary roller 109 of an auxiliary pressurizing member is arranged on the farther upstream side than the pressure roller 107 in the scanning direction b of the pressure roller 107. The auxiliary roller 109 is supported and moved by a roller support device 110. Incidentally, a second roller support device for supporting and moving the auxiliary roller 109 may be provided separately from the roller support device 110. The auxiliary roller 109 of Embodiment 2 pressurizes the upstream part 210 on the farther upstream side than the pressurized part 208 in the scanning direction b of the film 203 toward the object 104, and thereby adjusts the distance between the upstream part 210 and the object 104. The roller support device 110 vertically adjusts the position in the Z direction of the auxiliary roller 109 so that the flection of the film 203 after the releasing step may be suppressed, and so that the upstream side angle θ2 between the film 203 and the object 104 may become a proper angle. As a result of this, it becomes possible to transfer the adhesive 204 over the entire surface of the object 104 with stability.

Modified Example

Figure 6B:
FIG. 6B is a cross sectional view showing the adhesive transfer method of Modified Example of Embodiment 2.

FIG. 6B is a cross sectional view of an adhesive transfer device 101 of Modified Example of Embodiment 2 at the same position as line AA of FIG. 3B. The adhesive transfer device 101 of Modified Example of Embodiment 2 has an auxiliary roller 109 as with Embodiment 2. The matters in common with Embodiment 2 will not be described. The auxiliary roller 109 of Modified Example of Embodiment 2 moves in the scanning direction b while pressurizing the upstream part 210 of the film 203 against the object 104 as with the pressure roller 107. As a result of this, the portion from the pressurized part 208 by the pressure roller 107 to the upstream side pressurized part 211 by the auxiliary roller 109 of the upstream part 210 of the film 203 is bonded to and is in close contact with the object 104. Further, the portion on the farther upstream side than the upstream side pressurized part 211 is released and separated from the object 104. The roller support device 110 may have a configuration in which the distance between the pressure roller 107 and the auxiliary roller 109 in the scanning direction b (X direction) can be changed. As a result of this, it is possible to arbitrarily control the time from bonding of the adhesive 204 on the film 203 onto the object 104 to release thereof. For example, with the adhesive transfer method in which a thermoplastic adhesive 204 is heated by the heater 111, and the viscosity is reduced for transfer, the time from bonding of the adhesive 204 onto the object 104 to release thereof is the heating time. Accordingly, it becomes possible to adjust the heating time so as to achieve the optimum viscosity.

Embodiment 3

Elevating Mechanism (Spring)

An adhesive transfer device of Embodiment 3 of the present invention will be described. With an adhesive transfer device 101 of Embodiment 3, the first frame support part 105 has a first elevating mechanism 400A for changing the height (first support height) supporting a first side 206 (first fixing part) of a frame 202. The first elevating mechanism 400A is configured such that the first support height increases as the pressure roller 107 moves in the scanning direction b during the transfer step of the adhesive 204. Further, a second frame support part 106 has a second elevating mechanism 400B for changing the height (second support height) supporting a second side 207 (second fixing part) of the frame 202. The second elevating mechanism 400B is configured such that the second support height decreases as the pressure roller 107 moves in the scanning direction b during the transfer step of the adhesive 204.

Particularly, the height (the upstream side support height) at which the end on the upstream side of the film 203 is supported at the position on the farther upstream side than one end (the upstream side end) of the object 104 in the scanning direction b is changed according to the position of the pressure roller 107. The upstream side support height is determined by the height (the first support height) at which the first frame support part 105 supports the first side 206 of the frame 202. Further, the height (the downstream side support height) supporting the end on the downstream side of the film 203 at the position on the farther downstream side than the other end (the downstream side end) of the object 104 in the scanning direction b is changed according to the position of the pressure roller 107. The downstream side support height is determined by the height (the second support height) at which the second frame support part 106 supports the second side 207 of the frame 202. In the following description, the description of the upstream side support height and the downstream side support height can be appropriately read as the description of the first support height and the second support height.

Figure 7:
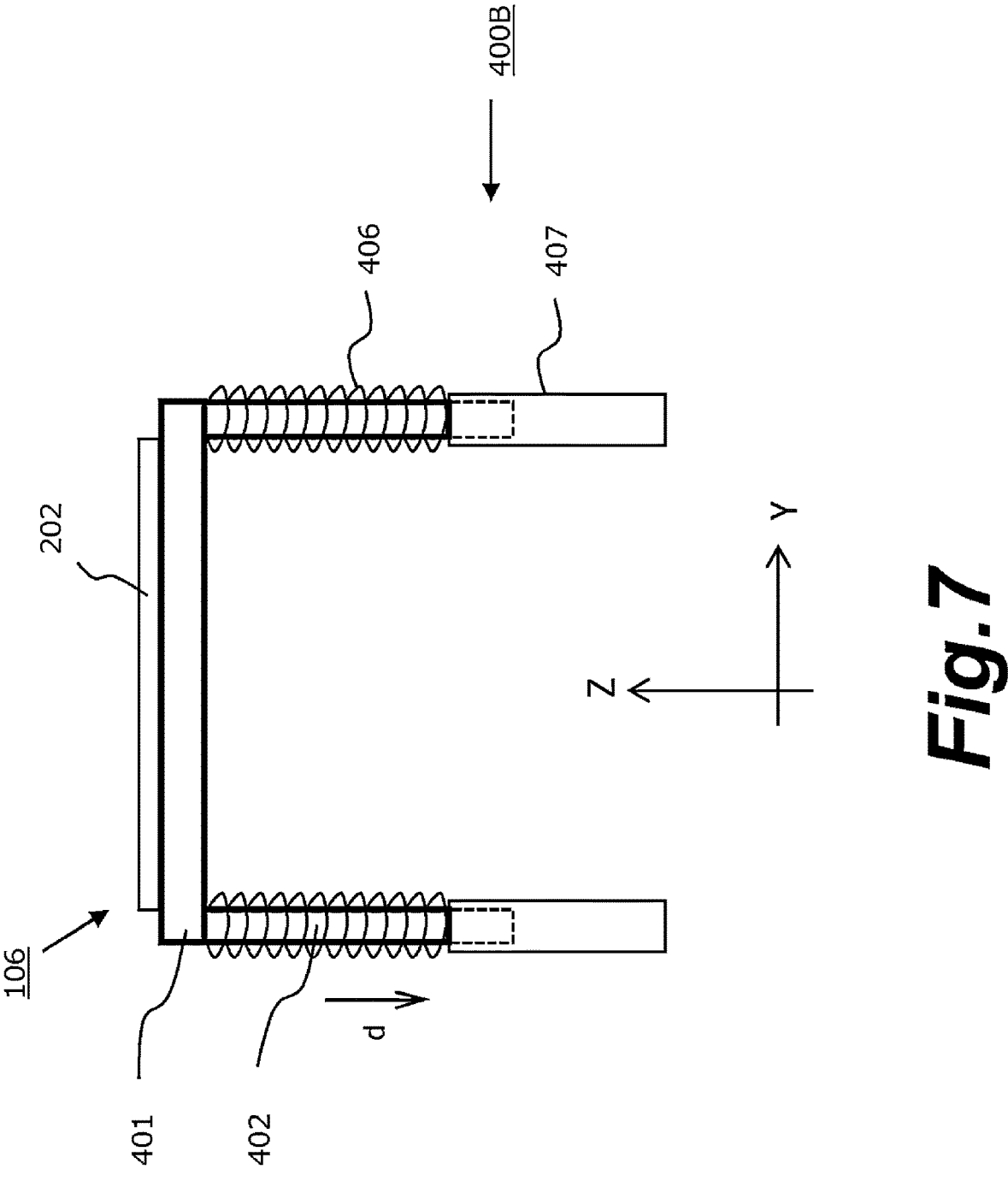
FIG. 7 is a schematic view of a second frame support part of Embodiment 3.

FIG. 7 is a view for illustrating the second elevating mechanism 400B of the second frame support part 106 of the adhesive transfer device 101 of Embodiment 3, and a schematic view of the pressure roller 107 as seen from the scanning direction (X direction). Incidentally, the first elevating mechanism 400A with the same configuration will not be described nor shown.

As shown in FIG. 7, the second frame support part 106 has a frame setting bar 401 for supporting the second side 207 of the frame 202, and a second elevating mechanism 400B for elevating the frame 202. The second elevating mechanism 400B has a shaft member 402 for supporting the frame setting bar 401, a housing 407 through which the shaft member 402 is inserted, and a coil-shaped spring 406 through which the shaft member 402 is inserted. The shaft member 402 is movable in the Z direction in the housing 407. The spring 406 is an elastic member expanding and contracting by a vertically downward force applied to the second frame support part 106, and causes an elastic force according to the distance in the Z direction between the frame setting bar 401 and the housing 407 to act on the frame setting bar 401 and the housing 407. The frame setting bar 401 stops moving at the position at which the vertically downward force acting on the frame setting bar 401 via the frame 202 and the elastic force of the spring 406 are in balance. The stop position of the frame setting bar 401 determines the height at which the second frame support part 106 supports the second side 207 of the frame 202. Therefore, the downstream side support height is determined. The vertically downward force acting on the frame setting bar 401 is determined by the weights of the frame 202 and the film 203, the pressurizing force of the pressure roller 107, the downstream side angle θ1 and the upstream side angle θ2 formed between the film 203 and the object 104, and the position in the X direction of the pressure roller 107.

Movement of Elevating Mechanism

Referring to FIGS. 8A to 8D, an adhesive transfer method using the adhesive transfer device 101 of Embodiment 3 will be described. FIGS. 8A to 8D are each a cross sectional view of a part of the adhesive transfer device 101 for illustrating the adhesive transfer method at the same position as line AA of FIG. 3B. Incidentally, the contents in common with the adhesive transfer method described by reference to FIGS. 4A to 4D will not be appropriately described.

Figure 8A:
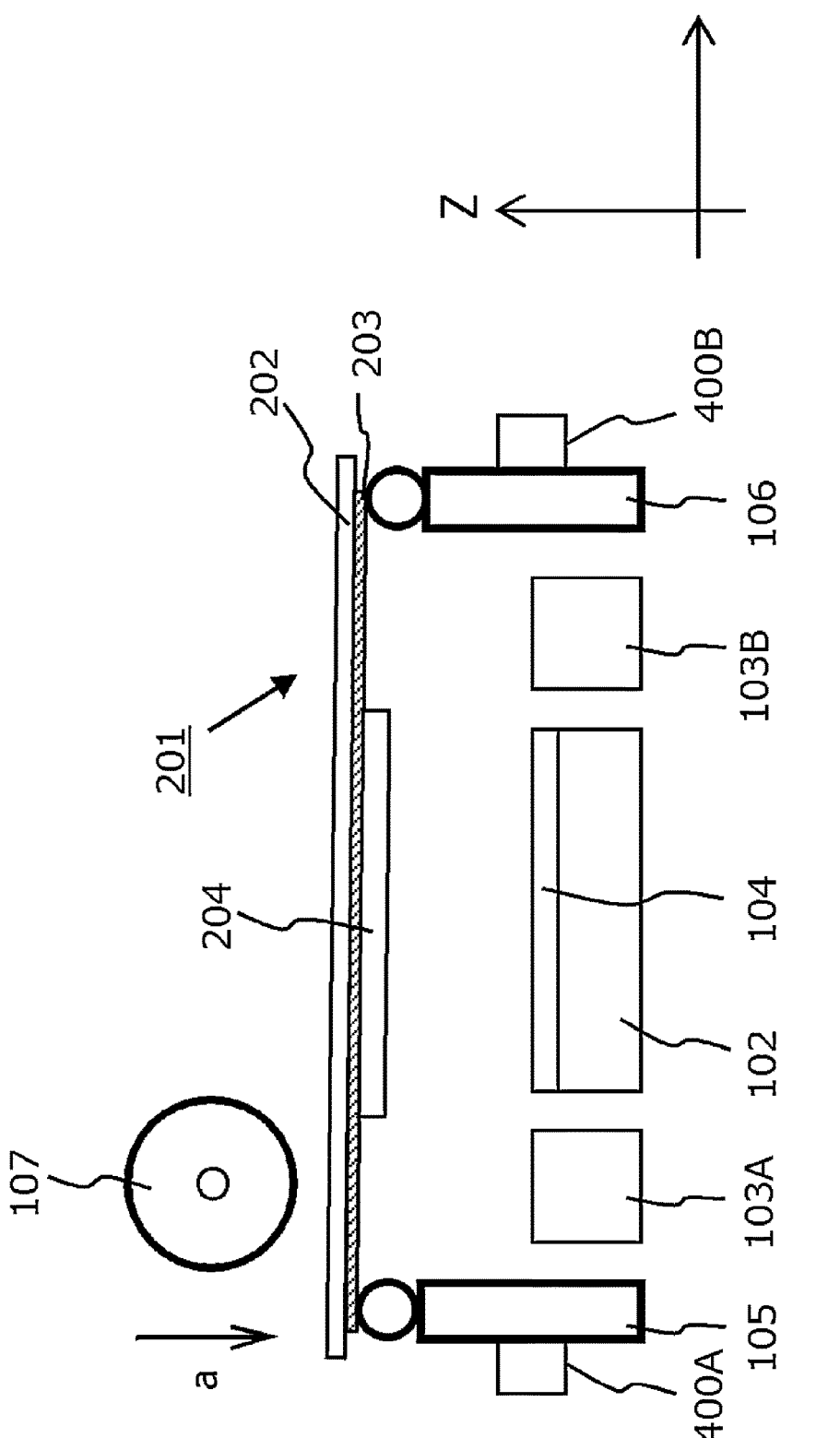
FIG. 8A is a cross sectional view showing an adhesive transfer method of Embodiment 3.

First, as shown in FIG. 8A, the object 104 is set on the stage 102, the film 203 including the adhesive 204 formed on the surface thereof is fixed on the frame 202, and the frame jig 201 is set in the frame support device 100. The first frame support part 105 has the first elevating mechanism 400A, and the second frame support part 106 has the second elevating mechanism 400B. Incidentally, the first elevating mechanism 400A and the second elevating mechanism 400B are not shown for avoiding the complication of the drawings in FIGS. 8B to 8D. A first portion 103A of the auxiliary stage 103 is set between the stage 102 and the first frame support part 105, and a second portion 103B of the auxiliary stage 103 is set between the stage 102 and the second frame support part 106. The roller support device 110 moves down the pressure roller 107 vertically downward (−Z direction. indicated with an arrow a) from the back surface side of the film 203 toward the first portion 103A of the auxiliary stage 103.

In the state of FIG. 8A, the pressure roller 107 has not come in contact with the film 203 yet. Therefore, the film 203 and the frame 202 including the same fixed thereon, and the frame jig 201 are not applied with a pressurizing force by the pressure roller 107. For this reason, the first frame support part 105 and the second frame support part 106 are equally applied with only the weight of the frame jig 201, so that the upstream side support height and the downstream side support height become roughly equal to each other.

Figure 8B:
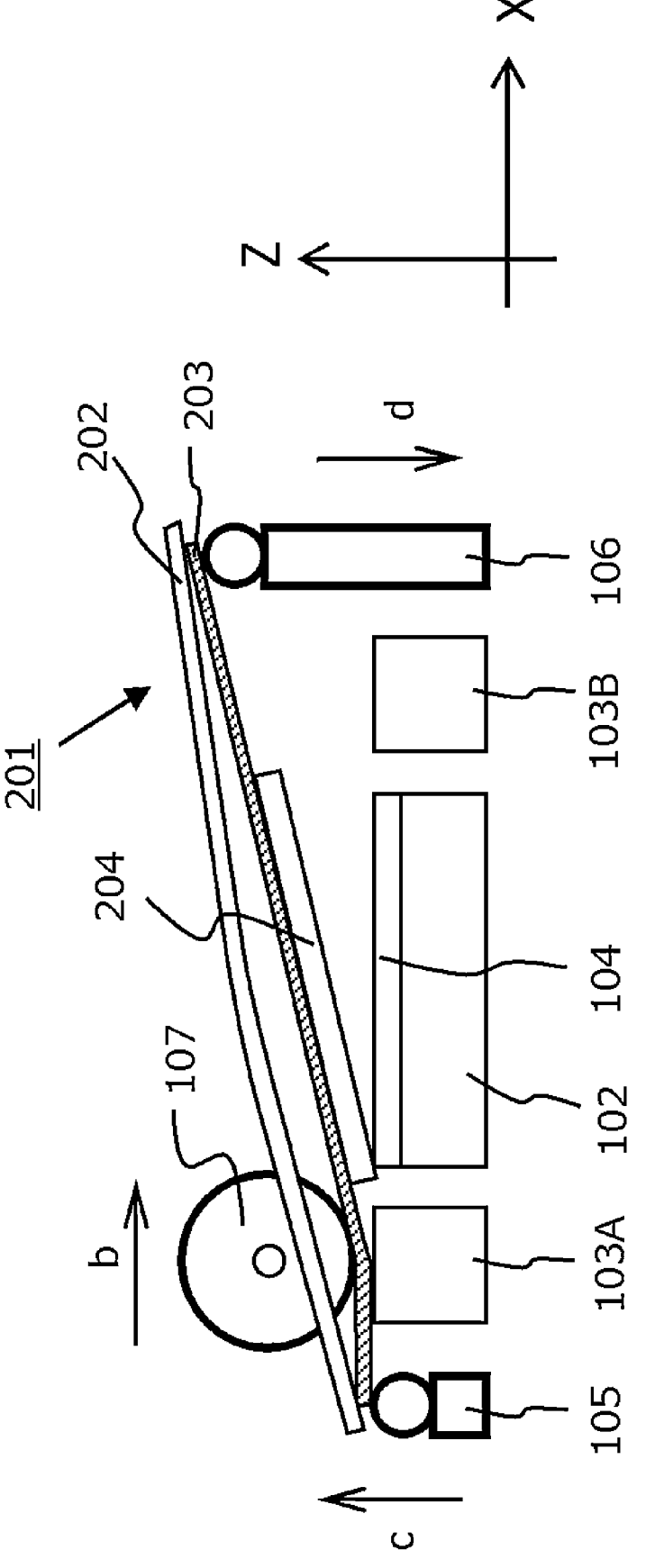
FIG. 8B is a cross sectional view showing the adhesive transfer method of Embodiment 3.

Then, as shown in FIG. 8B, the pressure roller 107 is moved down to the position at which the film 203 is pressurized from the back surface side against the first portion 103A of the auxiliary stage 103 by the pressure roller 107. As a result of this, the portion of the film 203 close to the first frame support part 105 is applied with a pressurizing force of the pressure roller 107, so that the vertically downward force applied to the first frame support part 105 becomes larger than the vertically downward force applied to the second frame support part 106. The state of FIG. 8B is the state in which the pressure roller 107 is the closest to the first frame support part 105, and the state in which the vertically downward force applied to the first frame support part 105 is the largest. Therefore, the upstream side support height is the lowest.

Subsequently, the pressure roller 107 is moved in the scanning direction b. When the pressure roller 107 reaches the upstream side end of the object 104, it results that the film 203 is pressurized from the back surface side against the object 104 by the pressure roller 107. Herein, support and movement by the roller support device 110 are performed so that the pressure roller 107 may pressurize the film 203 with such a pressure that the adhesive 204 formed on the surface of the film 203 comes in contact with and comes in close contact with the surface of the object 104. As a result of this, the adhesive 204 is bonded onto the surface of the object 104.

Figure 8C:
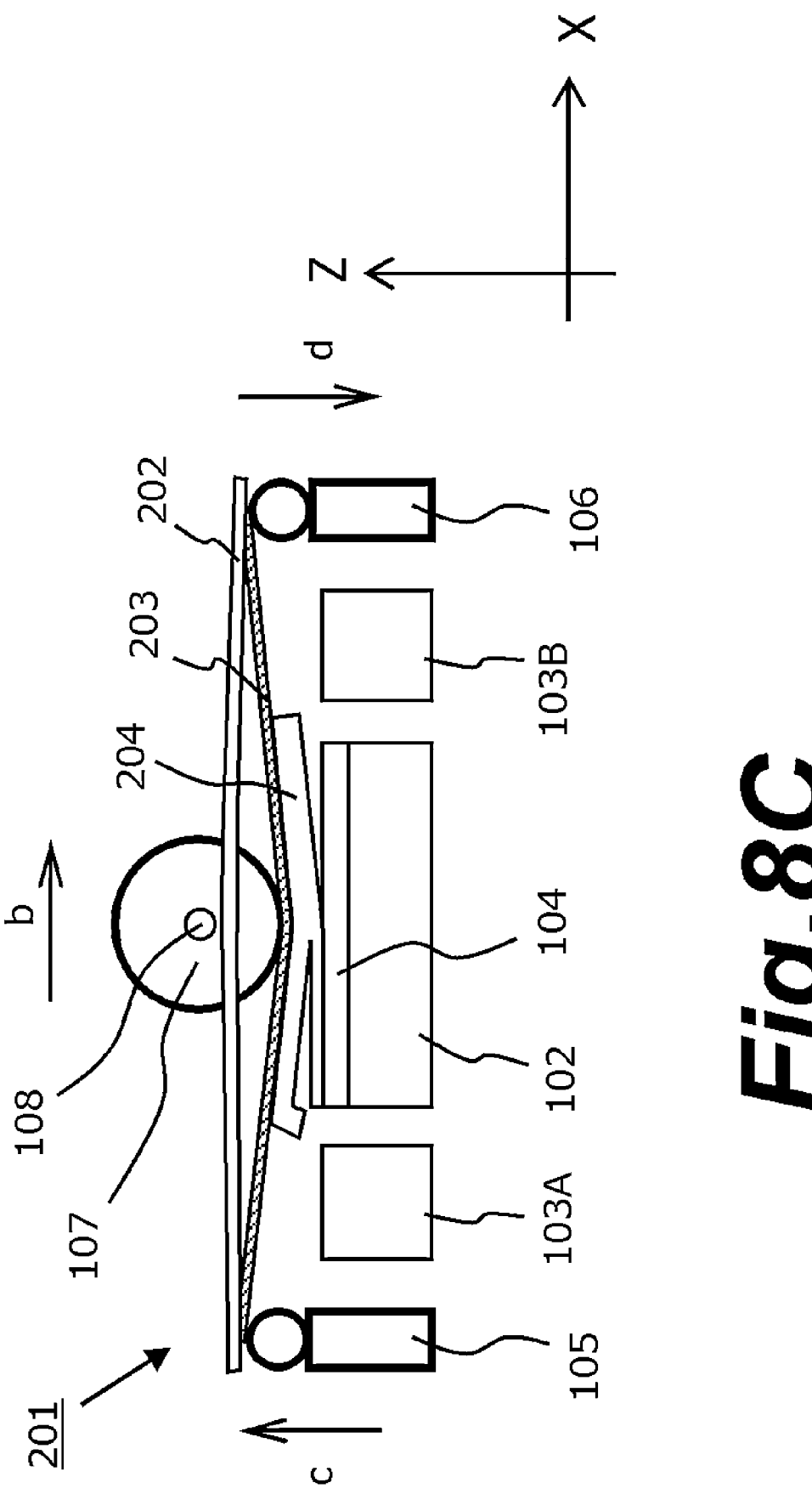
FIG. 8C is a cross sectional view showing the adhesive transfer method of Embodiment 3.

Then, as shown in FIG. 8C, there is performed a moving step of moving the pressure roller 107 in a given moving direction (the scanning direction b) from the upstream side end to the downstream side end of the object 104. As the position of the pressure roller 107 moves away from the first frame support part 105 and comes closer to the second frame support part 106, the force applied to the first frame support part 105 decreases, and the force applied to the second frame support part 106 increases. Therefore, the upstream side support height gradually increases, and the downstream side support height gradually decreases.

In conjunction with the movement of the pressure roller 107 moving in the scanning direction b while pressurizing the film 203, the second elevating mechanism 400B of the second frame support part 106 moves in the −Z direction (indicated with an arrow d). As a result of this, the adhesive 204 formed on the film 203 is bonded onto the object 104. Further, in conjunction with the movement of the pressure roller 107 moving in the scanning direction b while pressurizing the film 203, the first elevating mechanism 400A of the first frame support part 105 moves in the +Z direction (indicated with an arrow c). As a result of this, the first side 206 of the frame 202 is raised, and accordingly, the film 203 is released so that a part of the adhesive 204 is left on the object 104.

Figure 8D:
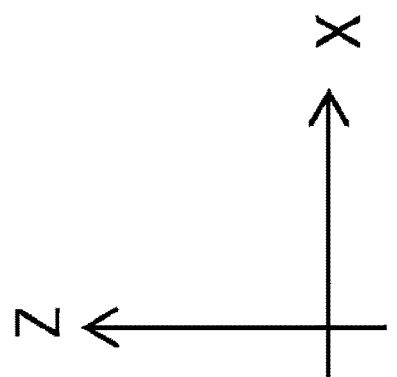
FIG. 8D is a cross sectional view showing the adhesive transfer method of Embodiment 3.
Figure 8D:
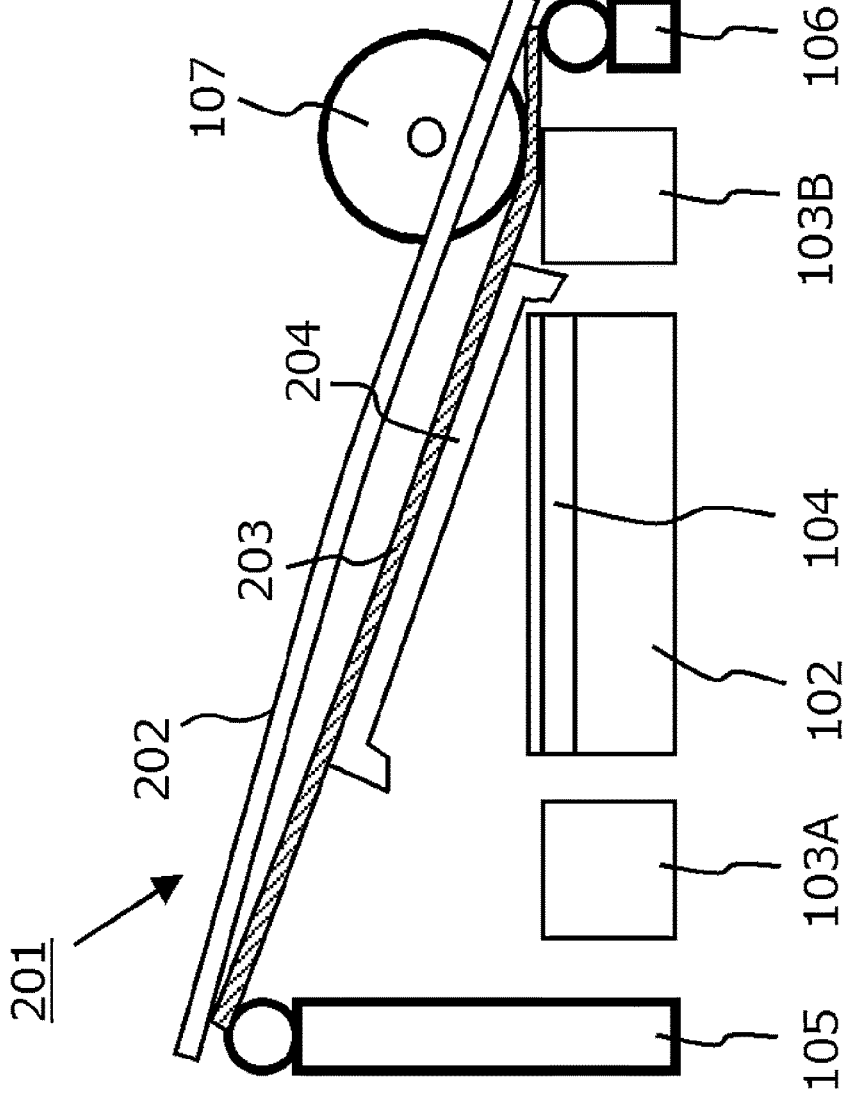

Then, as shown in FIG. 8D, the pressure roller 107 is moved to the second portion 103B of the auxiliary stage 103 set on the downstream side of the stage 102 in the scanning direction b. As a result of this, transfer of the adhesive 204 onto the entire surface of the object 104 is completed. At this step, the pressurizing force of the pressure roller 107 is applied to the portion of the film 203 close to the second frame support part 106, so that the vertically downward force applied on the second frame support part 106 becomes larger than the vertically downward force applied on the first frame support part 105. The state of FIG. 8D is a state in which the pressure roller 107 is the closest to the second frame support part 106, and a state in which the vertically downward force applied on the second frame support part 106 is the largest. Therefore, it results that the downstream side support height is the lowest.

Figure 9A:
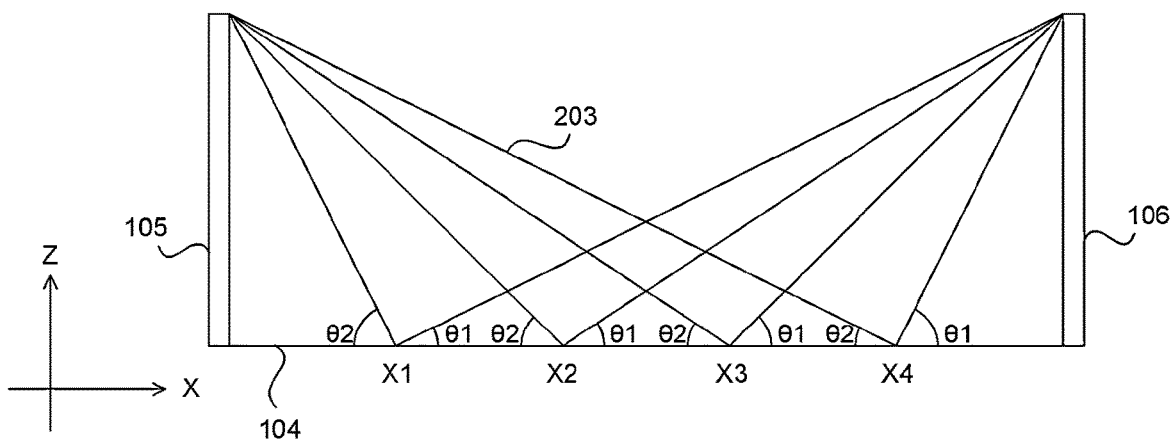
FIGS. 9A and 9B are views for illustrating the effects of Embodiment 3.
Figure 9B:
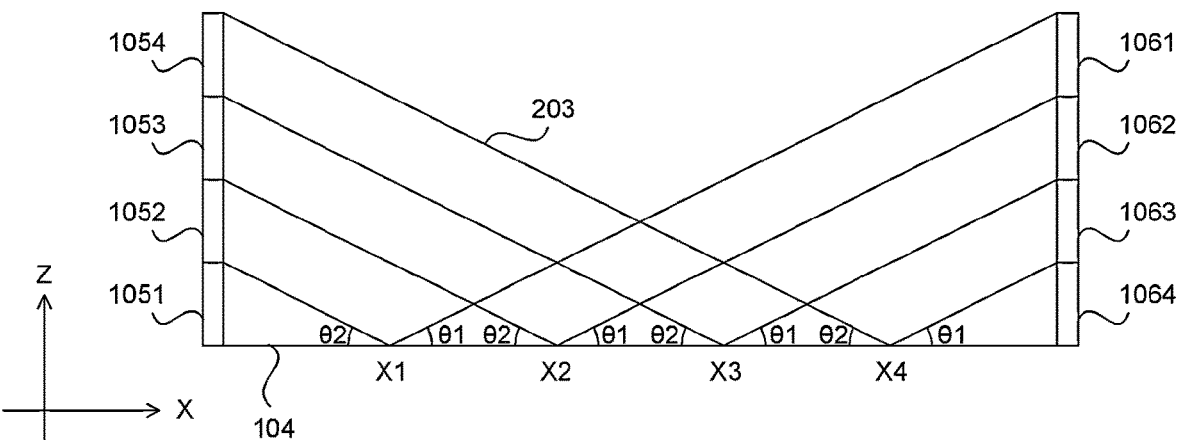

FIGS. 9A and 9B are each a view for illustrating the advantageous effects of Embodiment 3. FIGS. 9A and 9B are each a view schematically showing the cross section at the same position as line AA of FIG. 3B of a part of the adhesive transfer device 101 as with FIGS. 3C and 8. FIGS. 9A and 9B each show changes in the downstream side angle θ1 and the upstream side angle θ2 formed between the film 203 and the object 104 according to the position in the scanning direction (X direction) of the pressure roller 107. For simplification, other constituent elements than the first frame support part 105 and the second frame support part 106, the film 203, and the object 104 are not shown.

FIG. 9A shows the case (Embodiment 1) where the upstream side support height and the downstream side support height are constant. As the pressure roller 107 moves from a position X1 close to the first frame support part 105 to a position X4 close to the second frame support part 106, the upstream side angle θ2 decreases, and the downstream side angle θ1 increases.

FIG. 9B shows the case (Embodiment 3) where the upstream side support height and the downstream side support height are variable according to the position (transfer position) of the pressure roller 107. As described in connection with FIGS. 8B to 8D, as the pressure roller 107 moves from the position X1 to the position X4, the upstream side support height moves up from the position with a reference numeral 1051 to the position with a reference numeral 1054. On the other hand, the downstream side support height moves down from the position with a reference numeral 1061 to the position with a reference numeral 1064.

In FIG. 9B, the reference numerals 1051 and 1061 show the first frame support part 105 and the second frame support part 106 when the pressure roller 107 is at the position X1, respectively. The reference numerals 1052 and 1062 show the first frame support part 105 and the second frame support part 106 when the pressure roller 107 is at the position X2, respectively. The reference numerals 1053 and 1063 show the first frame support part 105 and the second frame support part 106 when the pressure roller 107 is at the position X3, respectively. The reference numerals 1054 and 1064 show the first frame support part 105 and the second frame support part 106 when the pressure roller 107 is at a position X4, respectively.

As shown in FIG. 9B, the changes in the downstream side angle θ1 and the upstream side angle θ2 in accordance with the movement of the pressure roller 107 from the position X1 to the position X4 of the pressure roller 107 are smaller as compared with the case where the upstream side support height and the downstream side support height are constant irrespective of the position of the pressure roller 107 (FIG. 9A). For this reason, the behaviors of the adhesive 204 and the film 203 in the step of bonding the film 203 to the object 104, and the step of releasing the film 203 from the object 104 are stabilized irrespective of the position of the pressure roller 107, which enables uniform transfer of the adhesive 204 onto the entire surface of the object 104. Further, the magnitude of the vertically downward force acting on the film 203 in the direction of release from the frame 202 is stabilized irrespective of the position of the pressure roller 107. For this reason, the load imposed on the film 203 can be made constant, which can suppress release of the film 203.

Embodiment 4

Elevating Mechanism (Springs 2 Kinds)

A description will be given to an adhesive transfer device of Embodiment 4 of the present invention. The main difference between Embodiment 4 and Embodiment 3 resides in that the second elevating mechanism 400B has a plurality of springs having different repulsive forces (spring coefficients or elastic moduli). Other configurations in common with Embodiment 3 will not be described.

Figure 10A:
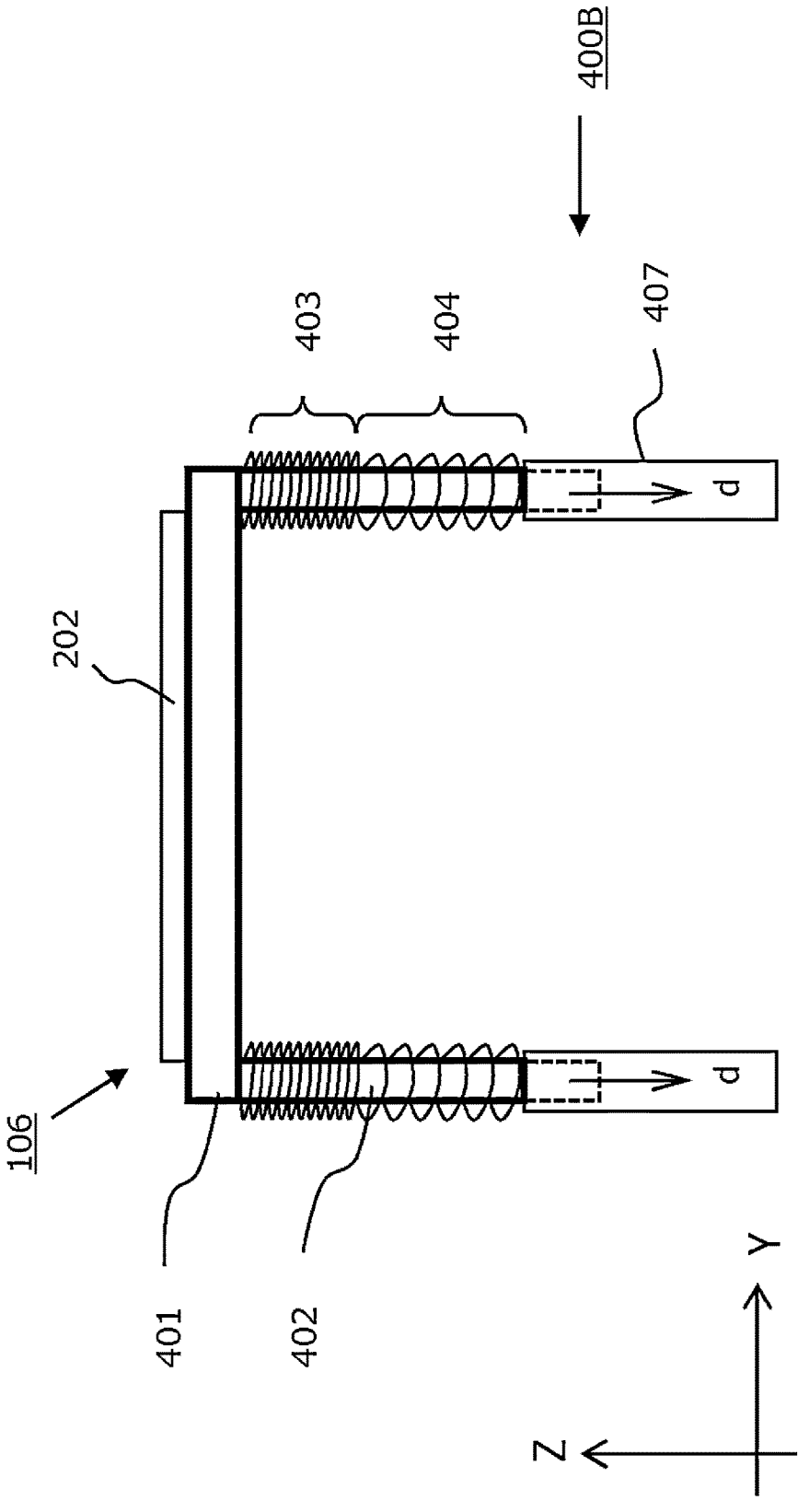
FIG. 10A is a schematic view of a second frame support part of Embodiment 4.
Figure 10B:
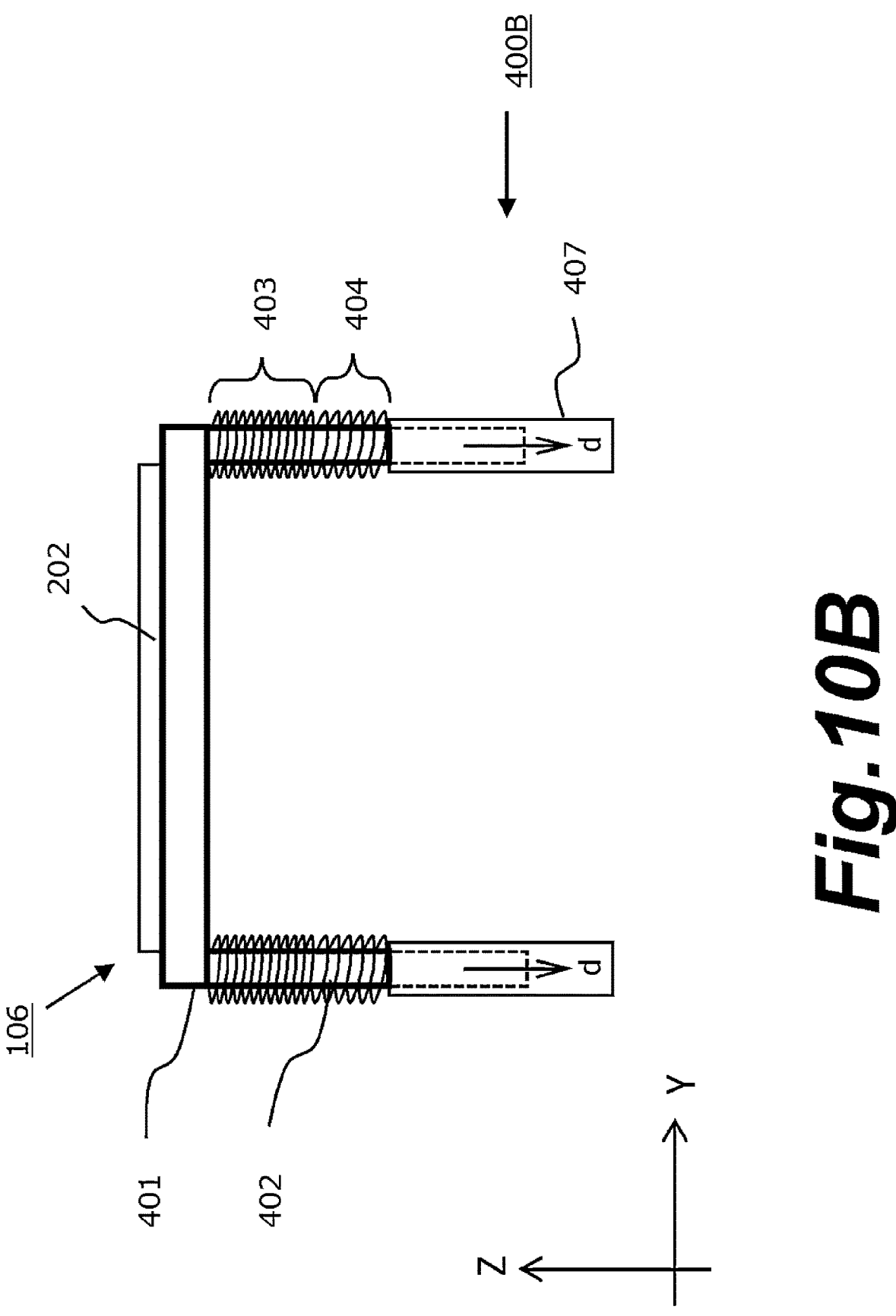
FIG. 10B is a schematic view of the second frame support part of Embodiment 4.
Figure 10C:
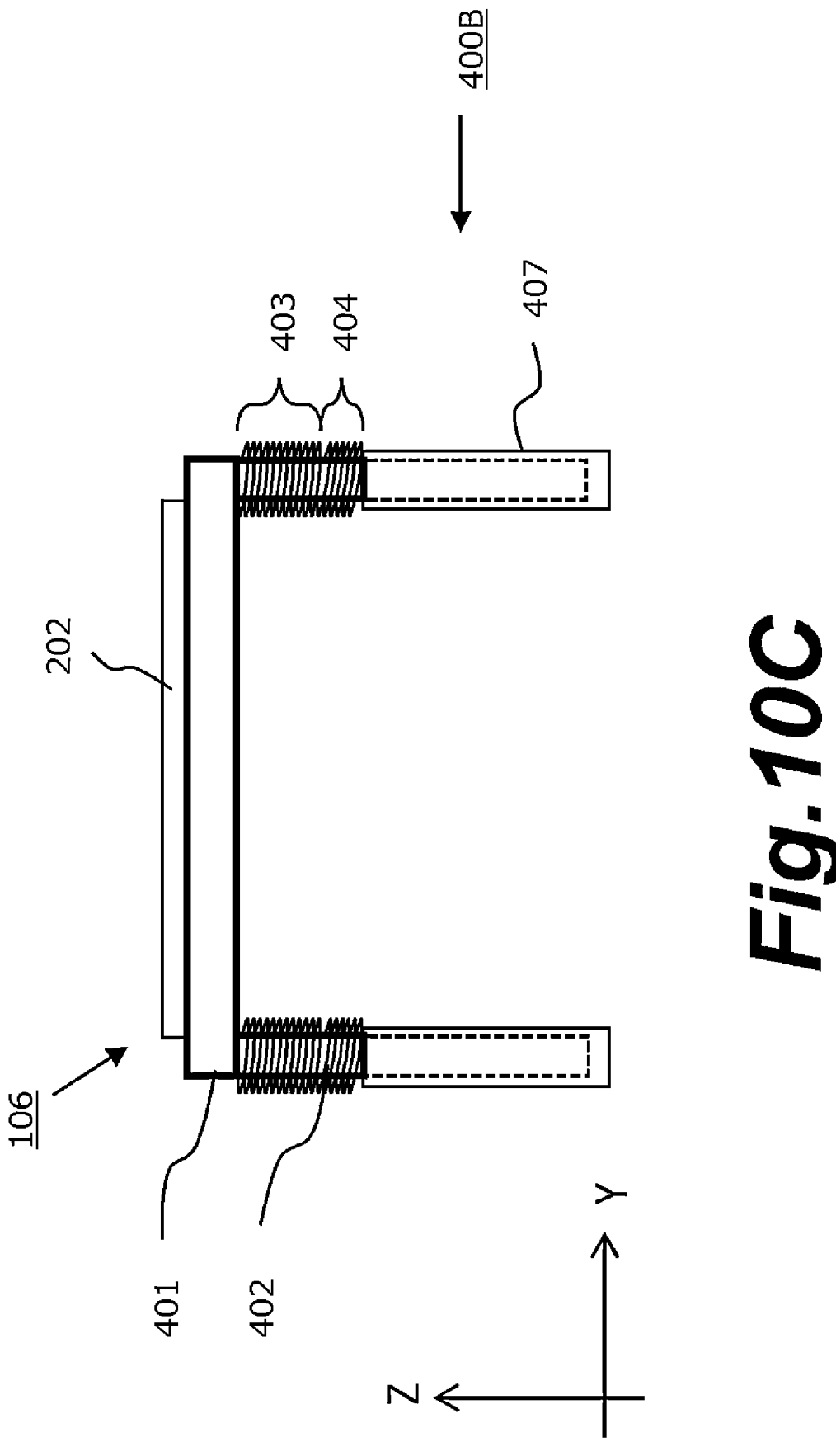
FIG. 10C is a schematic view of the second frame support part of Embodiment 4.

FIGS. 10A to 10C are each a schematic view of the second elevating mechanism 400B of the second frame support part 106 of the adhesive transfer device 101 of Embodiment 4 as seen from the scanning direction (X direction) of the pressure roller 107. Incidentally, the first elevating mechanism 400A of the first frame support part 105 may have the same configuration. FIG. 10A corresponds to the case where the pressure roller 107 is at the position of FIG. 8B, FIG. 10B corresponds to the case where the pressure roller 107 is at the position of FIG. 8C, and FIG. 10C corresponds to the case where the pressure roller 107 is at the position of FIG. 8D.

As shown in FIGS. 10A to 10C, the second elevating mechanism 400B of the second frame support part 106 of Embodiment 4 has a strong repulsive spring 403 having a relative larger spring coefficient, and a weak repulsive spring 404 having a relatively smaller spring coefficient. In Embodiment 4, the weak repulsive spring 404 is provided under (in the −Z direction of) the strong repulsive spring 403.

As shown in FIGS. 8B and 9B, at the initial stage of the transfer step (e.g., when the pressure roller 107 is situated at from the upstream side end of the object 104 to the position X1), the downstream side support height is relatively higher. At such a transfer step initial stage, the weak repulsive spring 404 is compressed rapidly, and hence, the descending speed of the downstream side support height is high. When the downstream side support height is high, a large load in the direction of release is imposed on the film 203 fixed on the second side 207. A descending speed of the high downstream side support height can prevent the load in the direction of release from being imposed on the film 203.

As shown in FIGS. 8D and 9B, at the final stage of the transfer step (e.g., when the pressure roller 107 is situated at from the position X4 to the downstream side end of the object 104), the downstream side support height is relatively lower. At such a transfer final stage, as the downstream side support height moves down, the strong repulsive spring 403 is compressed. For this reason, the descending speed of the downstream side support height is low. Therefore, even when the pressure roller 107 comes closer to the downstream side end of the object 104, the downstream side support height is kept at a certain degree of height. As a result of this, it is possible to prevent a force from acting on the film 203 in such a manner as to bond the film 203 onto the object 104 when the pressure roller 107 comes closer to the downstream side end of the object 104. Therefore, it is possible to prevent the following: the film 203 is unintentionally bonded to the object 104 in front of the pressure roller 107, so that the time between bonding and release of the film 203 to and from the object 104 is unintentionally elongated.

In this manner, in accordance with Embodiment 4, as the pressure roller 107 moves from the upstream side end to the downstream side end of the object 104, the descending speed of the downstream side support height decreases. For this reason, it is possible to perform transfer of the adhesive 204 with stability.

Modified Example

Regulating Member

A description will be given to an adhesive transfer device of Modified Example of Embodiment 4 of the present invention. The main difference of the Modified Example from Embodiment 4 resides in that the second elevating mechanism 400B has a regulating member 405 for regulating moving down of the shaft member 402. Other configurations in common with Embodiment 4 will not be described.

Figure 11A:
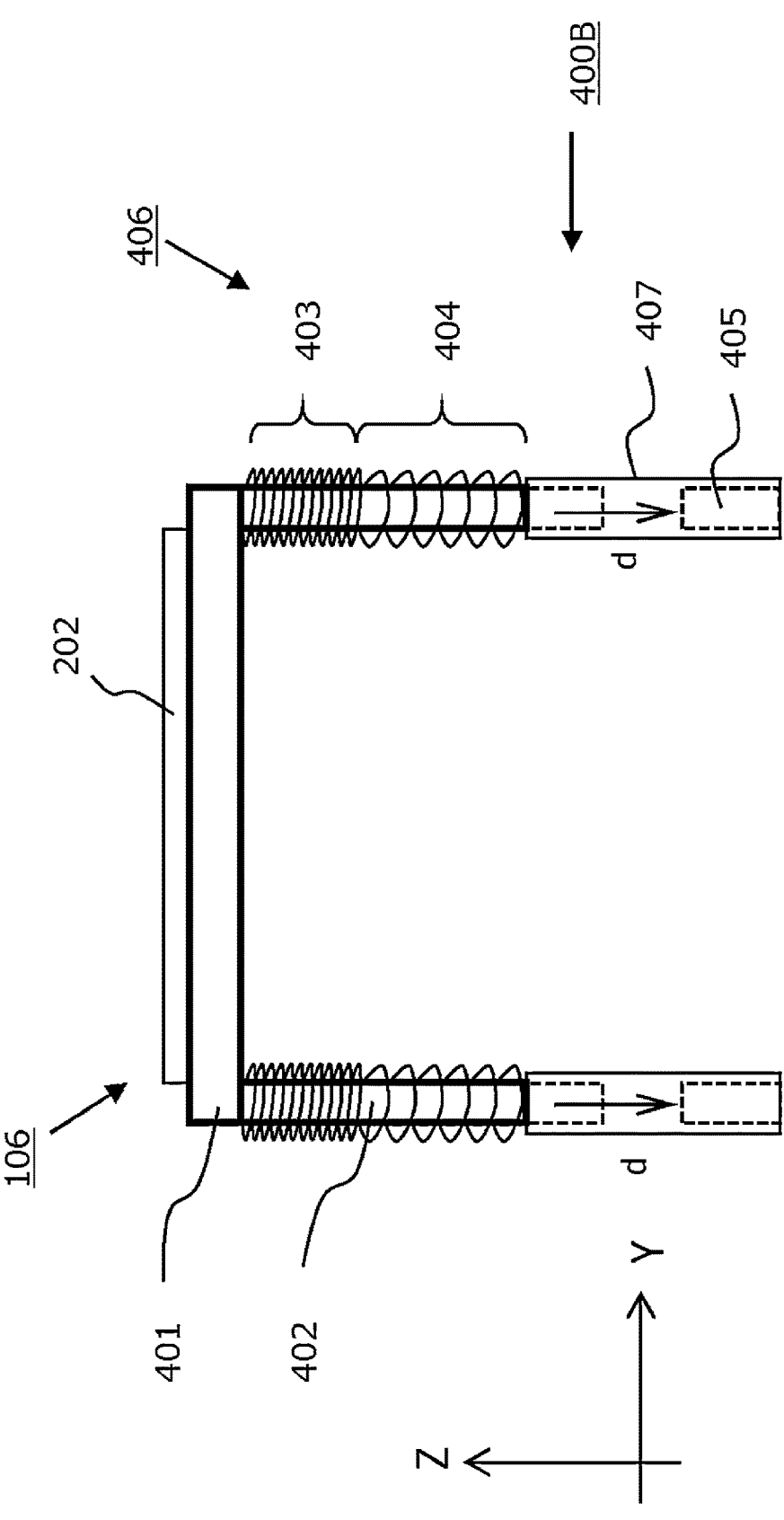
FIG. 11A is a schematic view of a second frame support part of Modified Example of Embodiment 4.
Figure 11B:
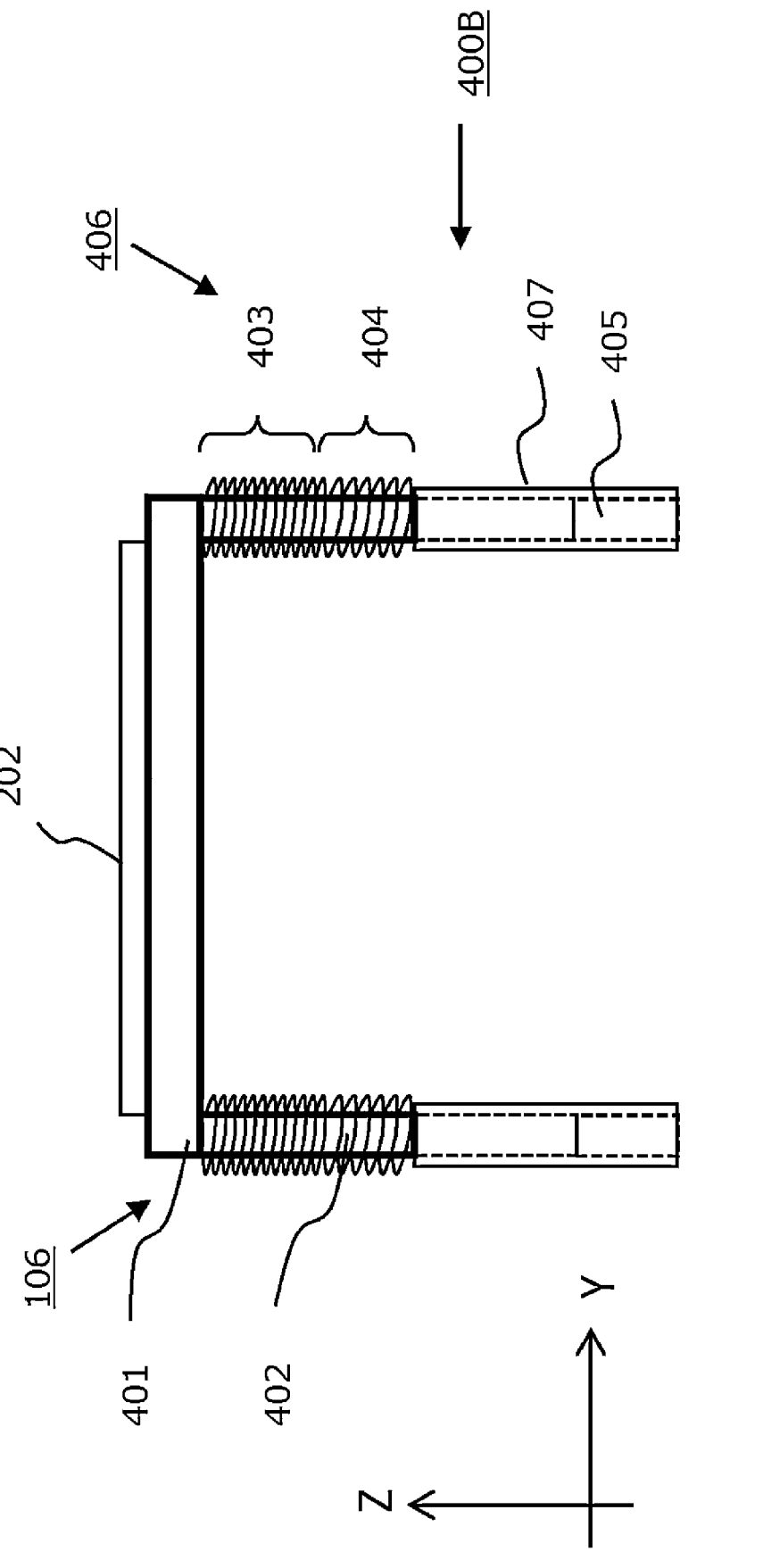
FIG. 11B is a schematic view of a second frame support part of Modified Example of Embodiment 4.

FIG. 11 is a schematic view of the second elevating mechanism 400B of the second frame support part 106 of an adhesive transfer device 101 of Modified Example of Embodiment 4 as seen from the scanning direction (X direction) of the pressure roller 107. Incidentally, the first elevating mechanism 400A of the first frame support part 105 may have the same configuration. FIG. 11A corresponds to the case where the pressure roller 107 is situated at the position of FIG. 8B, and FIG. 11B corresponds to the case where the pressure roller 107 is situated at the position of FIG. 8D.

The movement in the −Z direction of the shaft member 402 is regulated by the regulating member 405. The position of the regulating member 405 regulates the descending lower limit position of the shaft member 402. The regulating member 405 can regulate moving down of the shaft member 402 at a given height. Examples of the method for setting the regulating member 405 may include a method in which a pin-shaped jig is inserted into under the shaft member 402, and a method in which a rod-shaped jig is set under the shaft member 402.

As shown in FIG. 11B, moving down of the shaft member 402 can be regulated and stopped at the position of the regulating member 405. As a result of this, it is possible to prevent an excessive decrease in downstream side support height when the pressure roller 107 comes closer to the downstream side end of the object 104, which enables suppression of inferior transfer.

Elevating Mechanism (Motor)

A description will be given to an adhesive transfer device of Modified Example of Embodiment 4 of the present invention. Embodiment 4 showed a configuration having a spring as the elevating mechanism for changing the upstream side support height and the downstream side support height according to the position (transfer position) of the pressure roller 107. However, the configuration of the elevating mechanism is not limited to this example so long as it can implement the same function. For example, a configuration is also acceptable in which the upstream side support height and the downstream side support height are controlled positively using a driving means such as a motor. Below, an adhesive transfer device different from Embodiment 4 in that the upstream side support height and the downstream side support height can be changed by the driving force of a motor will be described as Modified Example of Embodiment 4. Other configurations in common with Embodiment 4 will not be described.

Figure 12:
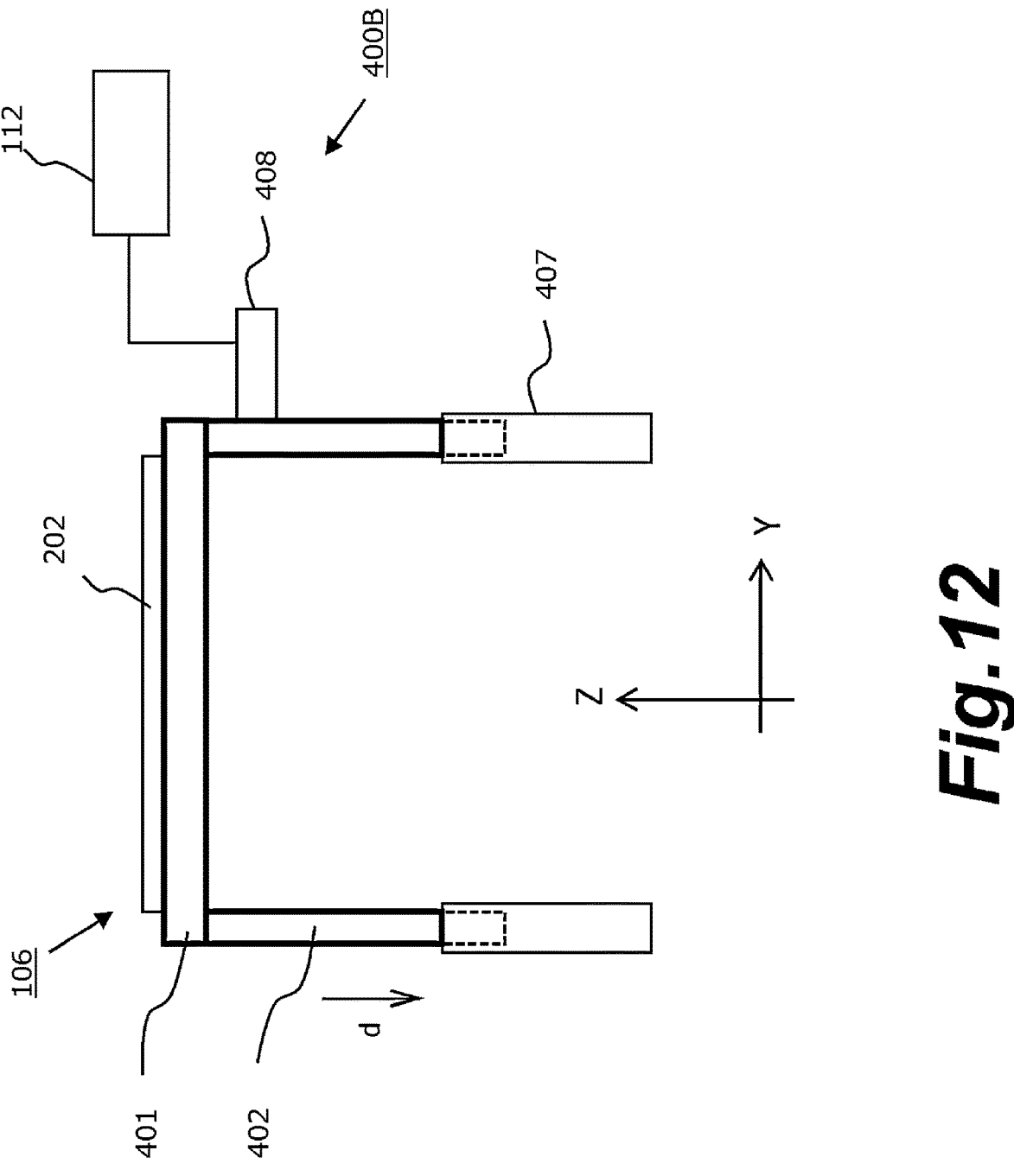
FIG. 12 is a schematic view of a second frame support part of Modified Example of Embodiment 4.
Figure 13:
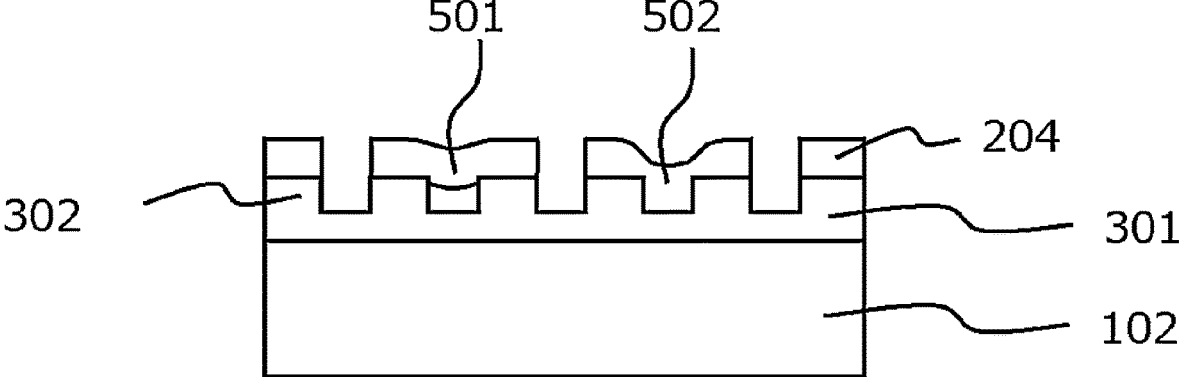
FIG. 13 is a cross sectional view showing the problem to be solved by the present invention.

FIG. 12 is a schematic view of the second elevating mechanism 400B of the second frame support part 106 of an adhesive transfer device 101 of Modified Example of Embodiment 4 as seen from the scanning direction (X direction) of the pressure roller 107. Incidentally, the first elevating mechanism 400A of the first frame support part 105 having the same configuration will not be described nor shown.

A motor 408 is a driving means controlled by the control part 112. The driving force of the motor 408 is transmitted to the shaft member 402 via a driving transmission mechanism such as a gear. For the driving transmission mechanism, a known configuration can be used, and hence particular description and showing will be omitted. The shaft member 402 can move up and down in the Z direction by the driving force transmitted from the motor 408. The control part 112 performs output control of the rotation direction, the rotation speed, and the like of the motor 408 so that the downstream side support height may become at a proper position according to the position (transfer position) of the pressure roller 107, or so that moving up and down at a proper speed may be achieved. As a result of this, it is possible to implement the changes in the downstream side support height and the upstream side support height according to the position of the pressure roller 107 as shown in FIG. 9B, and the operation such as regulation of the lower limit position of the downstream side support height as shown in FIG. 11 in the same manner as in Embodiment 4.

Below, specific Examples and Comparative Examples will be described.

Example 1

As the frame 202, there was used a frame of a SUS material with outside dimensions of 320×290 mm, dimensions of the opening of 270×240 mm, and a thickness of 1.2 mm. To the frame 202, a PET film with a thickness of 100 μm was fixed as the film 203 to the opposing first side 206 and second side 207 of the frame 202 by a double-sided tape as the fixing part 205. As the adhesive 204, a benzocyclobutene resin was formed with an average thickness of 10 μm in a circular region with a diameter of 210 mm as shown in FIG. 2 by spin coating. As the object 104, an 8-inch circular silicon wafer having an uneven part on the surface thereof was used. The object 104 was set at the stage 102 with the temperature of the heater 111 set at 100° C. and was heated after enough time. As the transfer step of the adhesive 204, first, as shown in FIG. 8A, the frame 202 with the film 203 having the adhesive 204 formed thereon fixed thereon was set at the frame support device 100. Subsequently, the pressure roller 107 was moved down in the vertically downward direction (the −Z direction, indicated with an arrow a) to the portion of the film 203 on the first frame support part 105 side, and was pressurized under 0.2 MPa as shown in FIG. 8B. At this step, the first frame support part 105 was set so as to be moved down, and the second frame support part 106 was set so as to be moved up.

Then, it was set so as to implement the following: as shown in FIG. 8C, the pressure roller 107 is moved in the scanning direction b from the first frame support part 105 toward the second frame support part 106, and the first frame support part 105 moves up, and the second frame support part 106 moves down in conjunction with the movement.

The benzocyclobutene resin used as the adhesive 204 had a steady flow viscosity of about 237 Pa·s at 100° C. Scanning of the pressure roller 107 was performed by movement in the +X direction at a speed of 3 mm/sec within the region from the upstream side end at a position of −120 mm in the X direction to the downstream side end at a position of +120 mm from the upstream end with reference to the center of the object 104. Further, the first elevating mechanism 400A of the first frame support part 105 performed upward movement from a height of 0 mm to 60 mm in the +Z direction with reference to the surface of the object 104 at a speed of 0.75 mm/sec. On the other hand, the second elevating mechanism 400B of the second frame support part 106 was formed in a configuration having a strong repulsive spring 403 and a weak repulsive spring 404 provided thereunder as shown in FIGS. 11A and 11B. Further, a pin-shaped jig was set as the regulating member 405 so that the height of the frame setting bar 401 may stop at a position of +5 mm in the Z direction with reference to the surface of the object 104.

A transfer experiment was carried out plural times, indicating that stable transfer of the adhesive 204 was possible without running down of the adhesive 204 onto the depressed portion of the silicon wafer surface.

Example 2

The downstream side angle θ1 and the upstream side angle θ2 were set as 0°<θ1<70°, and 0°<θ2<70°, respectively. Other conditions were set in the same manner as in Example 1. Thus, a transfer experiment was carried out plural times, indicating that stable adhesive transfer was possible.

Example 3

Of the springs for controlling the descending speed of the second elevating mechanism 400B of the second frame support part 106, as the weak repulsive spring 404, the one having a descending speed of about 5 mm/s was used, and the one having a descending speed of about 1 mm/s was used as the strong repulsive spring 403. Other conditions were set in the same manner as in Example 1. Thus, a transfer experiment was carried out plural times, indicating that stable adhesive transfer was possible.

Example 4

Moving down of the second elevating mechanism 400B of the second frame support part 106 was driving controlled by the motor 408, and the descending speed from start of the transfer step to the position of ⅓ of the dimension of the object 104 in the X direction was set at 5 mm/s. The descending speed from a position of ⅓ to a position of ⅔ of the dimension of the object 104 in the X direction was set at 2 mm/s. The descending speed from a position of ⅔ of the dimension of the object 104 in the X direction to the completion of the transfer step was set at 1 mm/s. Other conditions were set in the same manner as in Example 1. Thus, a transfer experiment was carried out plural times, indicating that stable adhesive transfer was possible.

Comparative Example 1

The pressure roller 107 was moved down in the –Z direction toward the portion on the second frame support part 106 side of the film 203 and was pressurized under 0.2 MPa. At this step, the first frame support part 105 was set to be moved up, and the second frame support part 106 was set to be moved down. From this state, the height of the second frame support part 106 was fixed, and the pressure roller 107 was moved from the second frame support part 106 toward the first frame support part 105. In conjunction with the movement, the first frame support part 105 was moved down. As a result, the adhesive 204 was bonded.

Then, the height of the second frame support part 106 was fixed, and the pressure roller 107 was moved from the first frame support part 105 toward the second frame support part 106. In conjunction with the movement, the first frame support part 105 was moved up, thereby releasing the adhesive 204. Other conditions were set in the same manner as in Example 1. Thus, a transfer experiment was carried out plural times, indicating that running down of the adhesive 204 into the depressed portion in the surface of the silicon wafer was caused.

Comparative Example 2

The temperature of the heater 111 of the stage 102 was set at 80° C. The CYCLOTENE 3022 used as the adhesive 204 had a steady flow viscosity of about 2972 Pa·s at 80° C. Other conditions were set in the same manner as in Example 1. Thus, a transfer experiment was carried out plural times. As a result, the adhesive 204 having a high viscosity prevented the occurrence of aggregation breaking transfer due to breakage in the adhesive layer, so that transfer stopped midway.

Comparative Example 3

The downstream side angle θ1 was set as 80°<θ1, and the upstream side angle θ2 was set as 0°<θ2<70°. Other conditions were set in the same manner as in Example 1. Thus, a transfer experiment was carried out plural times. As a result, at the film 203 fixed on the second side 207 of the frame 202 by a double-sided tape, release was caused at the interface between the double-sided tape and the film 203.

Comparative Example 4

The upstream side angle θ2 was set as 80°<θ2, and the downstream side angle θ1 was set as 0°<θ1<70°. Other conditions were set in the same manner as in Example 1. Thus, a transfer experiment was carried out plural times. As a result, at the film 203 fixed on the first side 206 of the frame 202 by a double-sided tape, release was caused at the interface between the double-sided tape and the film 203.

In accordance with the present invention, with an adhesive transfer method and an adhesive transfer device for bonding and releasing a film including an adhesive formed thereon on and from an object, thereby transferring the adhesive to the object, it is possible to shorten the time required for transferring the adhesive.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-197712, filed on Dec. 12, 2022, which is hereby incorporated by reference herein in its entirety.

What is claimed is:

1. An adhesive transfer method for transferring a thermoplastic adhesive formed on a surface of a film onto an object, the method comprising:

a heating step of heating the adhesive;

a pressurizing step of pressurizing the film from a back surface side thereof against the object by a pressurizing member; and a moving step of moving the pressurizing member from a first end toward a second end of the object in a given moving direction, wherein in a case where a portion of the film which is pressurized by the pressurizing member is referred to as a pressurized part, a portion of the film which is on a farther downstream side than the pressurized part in the moving direction is referred to as a downstream part, and a portion of the film which is on a farther upstream side than the pressurized part in the moving direction is referred to as an upstream part, in the moving step, the film is held, with the downstream part separated from the object and with the upstream part separated from the object, and a part of the adhesive formed at the downstream part is released at the upstream part, so that a part of the adhesive is transferred onto the object.

2. The adhesive transfer method according to claim 1, wherein in a case where a height for supporting an end of the film on an upstream side in the moving direction is referred to as an upstream side support height, and a heigh for supporting an end of the film on a downstream side in the moving direction is referred to as a downstream side support height, in the moving step, the upstream side support height and the downstream side support height change according to a position of the pressurizing member in the moving direction.

3. The adhesive transfer method according to claim 2, wherein as the pressurizing member moves in the moving direction, the upstream side support height increases, and the downstream side support height decreases.

4. The adhesive transfer method according to claim 3, wherein a speed of a decrease in the downstream side support height is changeable according to a position of the pressurizing member in the moving direction.

5. The adhesive transfer method according to claim 4, wherein the speed of the decrease in the downstream side support height slows down as the pressurizing member moves from the first end to the second end of the object.

6. The adhesive transfer method according to claim 1, wherein in the pressurizing step, in addition to the pressurizing member, the film is pressurized from the back surface side on a farther upstream side than the pressurizing member in the moving direction toward the object by an auxiliary pressurizing member, and in the moving step, the auxiliary pressurizing member is moved in the moving direction together with the pressurizing member, thereby adjusting a distance between the upstream part of the film and the object.

7. The adhesive transfer method according to claim 1, wherein in the pressurizing step, in addition to the pressurizing member, the film is pressurized from the back surface side on a farther upstream side than the pressurizing member in the moving direction against the object by an auxiliary pressurizing member, and in a case where a portion of the film which is pressurized by the auxiliary pressurizing member is referred to as an upstream side pressurized part, in the moving step, the auxiliary pressurizing member is moved in the moving direction together with the pressurizing member, such that the film is held, with a portion of the upstream part from the pressurized part to the upstream side pressurized part being in close contact with the object, and with a portion of the upstream part on a farther upstream side than the upstream side pressurized part in the moving direction being separated from the object.

8. The adhesive transfer method according to claim 6, wherein in the pressurizing step, a distance in the moving direction between the pressurizing member and the auxiliary pressurizing member is changeable.

9. The adhesive transfer method according to claim 1, wherein in a case where an angle formed between the upstream part of the film and the object surface is referred to as an upstream side angle, in the moving step, an end part of the film on an upstream side in the moving direction is supported at a higher position than a surface of the object, and the upstream side angle is larger than 0°.

10. The adhesive transfer method according to claim 9, wherein the upstream side angle is smaller than 70°.

11. The adhesive transfer method according to claim 9, wherein in the moving step, the upstream side angle is constant.

12. The adhesive transfer method according to claim 1, wherein in a case where an angle formed between the downstream part of the film and the object surface is referred to as a downstream side angle, in the moving step, an end part of the film on an upstream side in the moving direction is supported at a higher position than a surface of the object, and the downstream side angle is larger than 0°.

13. The adhesive transfer method according to claim 12, wherein the downstream side angle is smaller than 70°.

14. The adhesive transfer method according to claim 12, wherein in the moving step, the downstream side angle is constant.

15. The adhesive transfer method according to claim 1, wherein a viscosity of the adhesive in the moving step is 237 Pa·s or less.

16. The adhesive transfer method according to claim 1, wherein in the heating step, the adhesive in contact with the object is heated by a heating member provided on a stage, on which the object is set, via the stage.

* * * * *